(12) United States Patent
Notoya et al.

(10) Patent No.: US 8,205,980 B2
(45) Date of Patent: Jun. 26, 2012

(54) LIQUID COMPOSITION, INK-JET RECORDING PROCESS, INK-JET RECORDING INK SET, RECORDING UNIT, INK CARTRIDGE, INK-JET RECORDING APPARATUS, AND INK-JET RECORDING INK

(75) Inventors: Yasuharu Notoya, Tokyo (JP); Ryuji Katsuragi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1068 days.

(21) Appl. No.: 11/943,946

(22) Filed: Nov. 21, 2007

(65) Prior Publication Data

US 2008/0174643 A1 Jul. 24, 2008

(30) Foreign Application Priority Data

Nov. 24, 2006 (JP) ................................. 2006-316458

(51) Int. Cl.
*B41J 2/17* (2006.01)
(52) U.S. Cl. ............... 347/96; 347/95; 347/98; 347/100
(58) Field of Classification Search ............ 347/95–100; 106/31.13, 31.01, 31.97, 31.6
See application file for complete search history.

(56) References Cited

U.S. PATENT DOCUMENTS

| | | | |
|---|---|---|---|
| 5,198,023 A | 3/1993 | Stoffel | 106/22 R |
| 5,428,383 A | 6/1995 | Shields et al. | 347/96 |
| 5,451,251 A | 9/1995 | Mafune et al. | 106/22 H |
| 5,488,402 A | 1/1996 | Shields et al. | 347/96 |
| 5,555,008 A | 9/1996 | Stoffel et al. | 347/100 |
| 5,609,671 A | 3/1997 | Nagasawa | 106/20 R |
| 5,702,804 A * | 12/1997 | Malhotra | 428/32.13 |
| 5,728,201 A | 3/1998 | Saito et al. | 106/31.48 |
| 5,801,738 A | 9/1998 | Stoffel et al. | 347/100 |
| 5,976,233 A | 11/1999 | Osumi et al. | 106/31.86 |
| 6,139,139 A | 10/2000 | Stoffel et al. | 347/96 |
| 6,281,917 B1 | 8/2001 | Katsuragi et al. | 347/100 |
| 6,394,594 B1 | 5/2002 | Katsuragi et al. | 347/100 |
| 6,460,987 B1 | 10/2002 | Katsuragi et al. | 347/100 |
| 6,471,350 B2 | 10/2002 | Katsuragi et al. | 347/100 |
| 6,513,922 B2 | 2/2003 | Katsuragi et al. | 347/100 |
| 6,514,920 B1 | 2/2003 | Katsuragi et al. | 510/170 |
| 6,533,398 B2 | 3/2003 | Katsuragi et al. | 347/56 |
| 6,533,406 B2 | 3/2003 | Katsuragi et al. | 347/96 |
| 6,550,903 B2 | 4/2003 | Katsuragi et al. | 347/96 |
| 6,607,266 B2 | 8/2003 | Katsuragi et al. | 347/96 |
| 6,682,588 B2 | 1/2004 | Shioya et al. | 106/31.43 |
| 6,827,434 B1 | 12/2004 | Katsuragi et al. | 347/100 |
| 6,902,264 B2 | 6/2005 | Katsuragi et al. | 347/100 |
| 7,288,144 B2 * | 10/2007 | Uozumi et al. | 106/31.6 |
| 2007/0296790 A1 * | 12/2007 | Nakazawa et al. | 347/102 |

FOREIGN PATENT DOCUMENTS

EP 0 534 634 A1 3/1993
(Continued)

*Primary Examiner* — Matthew Luu
*Assistant Examiner* — Rut Patel
(74) *Attorney, Agent, or Firm* — Fitzpatrick, Cella, Harper & Scinto

(57) ABSTRACT

An ink-jet recording liquid composition which is used together with a colored ink to form images and is capable of causing reaction upon contact with the colored ink; the composition being characterized by containing at least (a) a polyvalent metal salt, (b) a substance selected from cryptands and (c) a liquid medium; or an ink-jet recording ink characterized by containing at least (a) a polyvalent metal salt, (b) a substance selected from cryptands, (c) a liquid medium and (d) a coloring material.

30 Claims, 7 Drawing Sheets

FOREIGN PATENT DOCUMENTS

| | | |
|---|---|---|
| JP | 5-186704 A | 7/1993 |
| JP | 5-202328 A | 8/1993 |
| JP | 6-106841 A | 4/1994 |
| JP | 8-003498 A | 1/1996 |

\* cited by examiner

LIQUID COMPOSITION, INK-JET RECORDING PROCESS, INK-JET RECORDING INK SET, RECORDING UNIT, INK CARTRIDGE, INK-JET RECORDING APPARATUS, AND INK-JET RECORDING INK

BACKGROUND OF THE INVENTION

1. Field of the Invention

This invention relates to a liquid composition, an ink-jet recording ink, an ink-jet recording ink set, an ink-jet recording process, a recording unit, an ink cartridge and an ink-jet recording apparatus. More particularly, it relates to an liquid composition, an ink-jet recording ink and an ink-jet recording ink set which are able to give a good print quality level, lessen color bleeding that may occur in forming color images and further achieve long-lifetime service for an ink-jet recording head making use of heat energy, and an ink-jet recording process, a recording unit, an ink cartridge and an ink-jet recording apparatus which make use of any of these.

2. Description of the Related Art

The ink-jet recording process makes it easy to provide compact apparatus, to achieve a low running cost and to form color images and is advantageous for the formation of color images. However, under circumstances where image are sought to have higher quality, it has some problems. For example, where different two kinds of inks are adjoiningly applied onto a recording medium, there is a problem that the inks may come mixed at color boundaries of these inks with each other to cause a phenomenon (bleeding) that makes the color images formed have a low quality level. In particular, such color mixing (color bleeding) at color boundaries between black ink and color inks may greatly affect image quality level to lower it. Accordingly, how to settle this problem is variously on study.

For example, as disclosed in Japanese Patent Application Laid-open No. H05-202328, U.S. Pat. No. 5,198,023 and Japanese Patent Application Laid-open No. H06-106841, a technique is proposed in which a first liquid containing a precipitant and a second liquid containing a colorant (coloring material) capable of forming precipitates by the aid of the precipitant are used in combination to control the color bleeding. Then, a polyvalent metal salt is disclosed as this precipitant, and a dye or the like having at least one carboxylic group is disclosed as the colorant capable of forming precipitates by the aid of the polyvalent metal salt. It is also disclosed that the first liquid may further contain a colorant. In such a case, the first liquid is also usable as an ink.

However, according to detailed studies made by the present inventors, the above background art has been found to have a problem to be resolved as stated below. For example, in order to prevent the color bleeding, a solution containing the polyvalent metal salt disclosed in Japanese Patent Application Laid-open No. H05-202328 is repeatedly ejected by a thermal ink-jet system, where a heater may come into wire break to disable the ejection of the polyvalent metal salt solution in some cases. This is presumed to be due to the following: Where an ink or liquid composition containing the polyvalent metal salt is overheated with a heater, anions constituting the polyvalent metal salt may unwantedly evaporate or break. As the result, cations (polyvalent metal ions) present in the vicinity of the heater increase in concentration to make the ink strongly alkaline, so that an outermost surface protective layer may melt which is formed of a metal such as tantalum and/or an oxide of the metal, as so presumed. To cope with this matter, the present inventors have made extensive studies on a liquid composition, or composition of inks, that is effective in preventing the color bleeding and also can keep the heater from its wire break to contribute to long-lifetime service of the recording head.

SUMMARY OF THE INVENTION

Accordingly, an object of the present invention is to provide a liquid composition which can give images having a good print quality level and also can achieve long-lifetime service of the ink-jet recording head, in an ink-jet recording process in which the liquid composition and at least one colored ink are made to adhere to a recording medium to perform recording thereon (the term "colored ink" is herein used to include black ink and color ink, as distinguished from "color ink" other than black ink).

Another object of the present invention is to provide an ink-jet recording ink set which is made up of a black ink and at least one color ink in combination, can give images having a good print quality level and also can achieve long-lifetime service of the ink-jet recording head.

A further object of the present invention is to provide an ink-jet recording ink set, and an ink-jet recording process, which can give images having a good print quality level and also can achieve long-lifetime service of the ink-jet recording head.

The above objects are achieved by the present invention described below. That is, a liquid composition according to a first embodiment of the present invention is an ink-jet recording liquid composition which is used together with a colored ink to form images and is capable of causing reaction upon contact with the colored ink; the composition being characterized by containing at least (a) a polyvalent metal salt, (b) a substance selected from cryptands and (c) a liquid medium.

An ink-jet recording process according to the first embodiment of the present invention is characterized by having the steps of (i) providing the above liquid composition with energy to eject the liquid composition toward a recording medium so as to be applied onto the recording medium and (ii) providing a colored ink with energy to eject the colored ink toward the recording medium so as to be applied onto the recording medium; the colored ink containing a coloring material and a liquid medium and being capable of reacting with the liquid composition upon contact with the liquid composition; and carrying out the above steps (i) and (ii) in such a way that the state of contact of the liquid composition with the colored ink is produced on the recording medium.

An ink-jet recording ink set according to the first embodiment of the present invention is characterized by combination of (1) the above liquid composition and (2) at least one colored ink which contains a coloring material and a liquid medium and is capable of reacting with the liquid composition upon contact with the liquid composition.

A recording unit according to the first embodiment of the present invention is characterized by having at least a liquid composition holder which holds the above liquid composition, an ink holder which holds a colored ink capable of reacting with the liquid composition upon contact with the liquid composition, and an ink-jet recording head having heads which provide the liquid composition and the colored ink with energy to eject the liquid composition and the colored ink respectively.

An ink cartridge according to the first embodiment of the present invention is characterized by having at least a liquid composition holder which holds the above liquid composition, and an ink holder which holds a colored ink containing a coloring material and a liquid medium and capable of reacting with the liquid composition upon contact with the liquid composition.

An ink-jet recording apparatus according to the first embodiment of the present invention is characterized by having at least a liquid composition holder which holds the above liquid composition, a colored ink holder which holds a colored ink capable of reacting with the liquid composition upon contact with the liquid composition, and an ink-jet recording head having heads which provide the liquid composition and the colored ink with energy to eject the liquid composition and the colored ink respectively.

An ink-jet recording ink according to a second embodiment of the present invention is characterized by containing at least (a) a polyvalent metal salt, (b) a substance selected from cryptands, (c) a liquid medium and (d) a coloring material.

An ink-jet recording process according to the second embodiment of the present invention is characterized by having the steps of (i) providing a black ink with energy for ejecting the ink, to eject the black ink toward a recording medium so as to be applied onto the recording medium and (ii) providing the above ink-jet recording ink as a color ink with energy for ejecting the ink, to eject the color ink toward the recording medium so as to be applied onto the recording medium; and carrying out the above steps (i) and (ii) in such a way that the state of contact of the black ink with the color ink is produced on the recording medium.

An ink-jet recording ink set according to the second embodiment of the present invention is characterized by combination of (1) the above ink-jet recording ink as at least one color ink and (2) a black ink which contains a coloring material and a liquid medium and is capable of reacting with the color ink upon contact with the color ink.

A recording unit according to the second embodiment of the present invention is characterized by having ink holders which respectively hold inks constituting the above ink set, and an ink-jet recording head having heads which provide the inks coming fed from the ink holders, with energy to eject the inks respectively.

An ink cartridge according to the second embodiment of the present invention is characterized by having ink holders which respectively hold inks constituting the above ink set.

An ink-jet recording apparatus according to the second embodiment of the present invention is characterized by having at least an ink holder which holds an ink set having a black ink and at least one color ink in combination, and an ink-jet recording head having heads which provide the inks coming fed from the ink holder, with energy to eject the inks respectively from the head, wherein the ink set is the ink set described above.

According to the present invention, a liquid composition, an ink-jet recording ink and an ink-jet recording ink set are provided which enable formation of images having water resistance, having a good print quality and less having the color bleeding that may occur in forming color images, and, in particular, can achieve long-lifetime service for the ink-jet recording head. According to the present invention, the use of these can provide an ink-jet recording process, a recording unit, an ink cartridge and an ink-jet recording apparatus which are able to obtain the above excellent effects.

Further features of the present invention will become apparent from the following description of exemplary embodiments with reference to the accompanying drawings.

DESCRIPTION OF THE EMBODIMENTS

Figure 1:
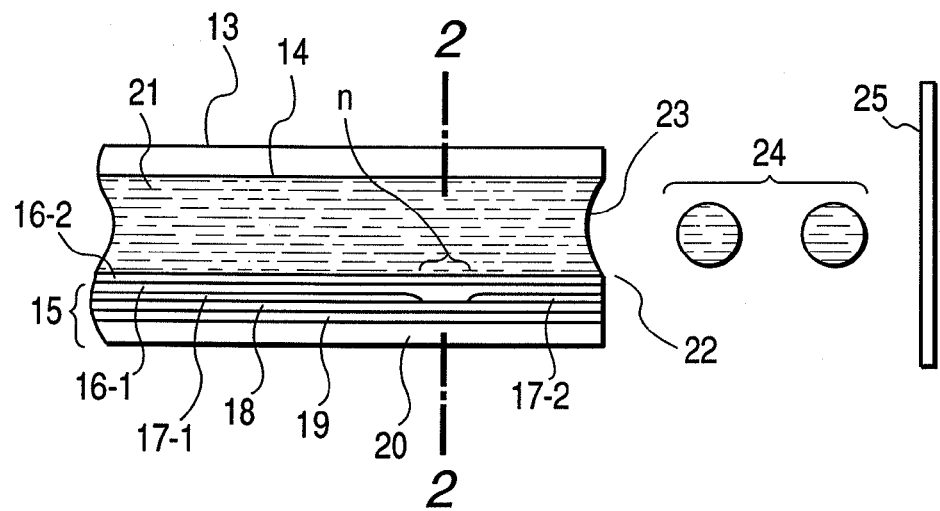
FIG. 1 is a longitudinal sectional view showing a recording head of the ink-jet recording apparatus of the present invention.

The present invention is described below in detail by giving preferred embodiments.

First Embodiment

The liquid composition of the present invention is an ink-jet recording liquid composition capable of causing reaction upon contact with a colored ink, and is characterized by containing at least (a) a polyvalent metal salt, (b) a substance selected from cryptands and (c) a liquid medium. As its specific use form, it may include a form in which recording is performed using the liquid composition made up as above, by applying the liquid composition and any colored ink onto a recording medium in such a way that the state of contact of the liquid composition with the colored ink used in usual recording is produced on the recording medium. Such a first embodiment is described below. The liquid composition used in the above may preferably be that which does not affect the color tone(s) of the colored ink(s) in the recorded images.

The component-(a) polyvalent metal salt used in the above embodiment is described first. The polyvalent metal salt may include polyvalent metal salts of inorganic acids such as nitric acid, sulfuric acid and hydrochloric acid, and carboxylic acids such as acetic acid, propionic acid, lactic acid, malic acid, gluconic acid and citric acid, and polyol phosphoric esters. For example, it may include magnesium salts, calcium salts, barium salts, iron(II) salts, copper(II) salts, zinc salts and aluminum salts. It may specifically include nitrates such as magnesium nitrate, calcium nitrate, barium nitrate, iron(II) nitrate, copper(II) nitrate, zinc nitrate and yttrium nitrate; sulfates such as magnesium sulfate, calcium sulfate, barium sulfate, iron(II) sulfate, copper(II) sulfate, zinc sulfate and yttrium sulfate; acetates such as magnesium acetate, calcium acetate, barium acetate, iron(II) acetate, copper(II) acetate, zinc acetate and yttrium acetate; gluconates such as magnesium gluconate, calcium gluconate, barium gluconate, iron (II) gluconate, copper(II) gluconate and zinc gluconate; and glycerophosphates such as magnesium glycerophosphate and calcium glycerophosphate. Of these, preferred are polyvalent metal salts having a high solubility in the liquid medium which are those enumerated below. For example, they are a magnesium salt or calcium salt of nitric acid, a magnesium salt or calcium salt of sulfuric acid, a magnesium salt or calcium salt of acetic acid, a magnesium salt or calcium salt of gluconic acid and a magnesium salt or calcium salt of polyolphosphate.

The liquid composition of the present invention contains at least one compound selected from the polyvalent metal salts enumerated above, to make up the composition. There are no particular limitations on the total content of such compound. In order to achieve a better effect of lessening the color bleeding and the durability of the recording head, the compound may preferably be contained in an amount ranging from 0.005% by mass to 20% by mass based on the total mass of the liquid composition. It may more preferably be contained in an amount ranging from 0.05% by mass to 12% by mass based on the total mass of the liquid composition.

The component-(b) substance selected from cryptands which makes up the liquid composition of the present invention is described next (this substance is hereinafter called a cryptand).

The cryptand is a sort of clathrate compounds (inclusion compounds), and refers to a cyclic compound containing nitrogen atoms. It may include, e.g., 4,7,13,18-tetraoxa-1,10-diazabicyclo[8,5,5]eicosane, which is called cryptand[211]; 4,7,13,16,21,24-hexaoxa-1,10-diazabicyclo[8,8,8]hexacosane, represented by the following formula (1) and called cryptand[222]; and 1,4,10,13-tetraoxa-7,16-diazacyclooctadecane, represented by the following formula (2). Of these, what is used in the present invention may preferably be the cryptand[222], represented by the following formula (1). That is, as a cryptand preferable in the present invention, it may particularly preferably be a crown ether made into bicyclic one, and be one having the structure as represented by the following formula (1), containing nitrogen as a doner. Crown ethers have a high ability to capture ions having positive electric charges, such as metallic ions or an ammonium salt. Then, a cryptand the ring of which stands double like that represented by the following formula (1) is known to have a much stronger ability to capture ions than the crown ethers. As to the component-(c) liquid medium making up the liquid composition of the present invention, the same one as what makes up each ink as described later may be used.

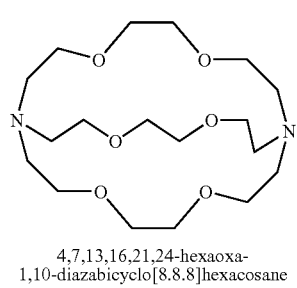

4,7,13,16,21,24-hexaoxa-
1,10-diazabicyclo[8.8.8]hexacosane (1)

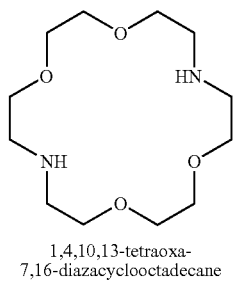

1,4,10,13-tetraoxa-
7,16-diazacyclooctadecane (2)

As to the total content of the above cryptand in the liquid composition, there are no particular limitations thereon. In order to achieve more superior long-lifetime service of the recording head by its addition, the cryptand may be contained in the amount described below. That is, it may preferably be contained in an amount ranging from 0.005% by mass to 20% by mass based on the total mass of the liquid composition, and more preferably from 0.05% by mass to 12% by mass based on the total mass of the liquid composition. Incidentally, the above % by mass based on the total mass is meant to be, assuming the total mass as 100, the proportion of that component contained in the total mass.

The first embodiment of the present invention is characterized by the use of the liquid composition of the present invention, made up as described above. The ink-jet recording process used in the first embodiment of the present invention is an ink-jet recording process of providing an ink or this liquid composition with energy for ejecting its droplets, to eject them to a recording medium to record images thereon. The ink-jet recording process of the present invention is characterized by having: (i) the step of providing the liquid composition of the present invention with energy to eject the liquid composition toward a recording medium so as to be applied onto the recording medium; and (ii) the step of providing at least one colored ink with energy to eject the colored ink toward the recording medium so as to be applied onto the recording medium; the colored ink containing a coloring material and a liquid medium and being capable of reacting with the liquid composition upon contact with the liquid composition; and carrying out the above steps (i) and (ii) in such a way that the state of contact of the liquid composition with the colored ink is produced on the recording medium. The colored ink (hereinafter simply "ink") used together with the liquid composition of the present invention is described below.

The ink used in the present invention contains at least a coloring material and a liquid medium to make up the composition. The ink is so used as to be ejected from an ink-jet recording head in such a way that the state of contact of the liquid composition of the present invention with the ink is produced on the recording medium. As the ink is used in this way, it may preferably be what is so made up as to be capable of reacting with polyvalent metal ions coming from the polyvalent metal salt contained in the liquid composition of the present invention, to make the coloring material in the ink agglomerate or precipitate or cause the thickening of the ink. As the coloring material making up the ink, a pigment or a dye may be used. As the pigment, all pigments may be used which are conventionally used for ink-jet recording, such as inorganic pigments and organic pigments, and may specifically include the following.

Carbon black; C.I. Pigment Yellow 1, 2, 3, 12, 13, 14, 16, 17, 73, 74, 75, 83, 93, 95, 97, 98, 114, 128, 129, 151, 154 and 195; C.I. Pigment Red 5, 7, 12, 48 (Ca), 48 (Mn), 57 (Ca), 57:1, 57 (Sr), 112, 122, 123, 168, 184 and 202; C.I. Pigment Blue 1, 2, 3, 15:3, 15:34, 16, 22 and 60; and C.I. Vat Blue 4 and 6.

Where the pigment as enumerated above is used as the coloring material, a dispersing agent may preferably be used in order for the pigment to be stably dispersed in the ink. The dispersing agent may include polymeric dispersing agents and surface active agent type dispersing agents.

As specific examples of the polymeric dispersing agents, those enumerated below may be used, for example; which are polyacrylates, styrene-acrylic acid copolymer salts, styrene-methacrylic acid copolymer salts, styrene-acrylic acid-acrylic ester copolymer salts, styrene-maleic acid copolymer salts, acrylic ester-maleic acid copolymer salts, styrene-methacrylsulfonic acid copolymer salts, vinylnaphthalene-maleic acid copolymer salts, β-naphthalenesulfonic acid formalin condensation product salts, polyvinyl pyrrolidone, polyethylene glycol, polyvinyl alcohol and so forth. Of these, it is particularly preferable to use a polymeric dispersing agent having a weight average molecular weight in the range of from 1,000 to 30,000 and an acid value in the range of from 100 to 430.

The surface active agent type dispersing agents may include, e.g., laurylbenzenesulfonates, laurylsulfonates, laurylbenzenecarboxylates, lauryl-naphthalenesulfonates, aliphatic amine salts and polyethylene oxide condensation products. Any of these dispersing agents may be used in an amount of pigment mass: dispersing agent mass=10:5 to 10:0.5.

As the coloring material of the ink, a self-dispersion type carbon black having been made self-dispersible by introducing hydrophilic groups into particle surface portions of carbon black as disclosed in Japanese Patent Application Laid-Open Nos. H5-186704 and H8-3498 may be used as the coloring material. In the case when such a self-dispersion type carbon black is used as the coloring material, the dispersing agent as described above need not necessarily be used. Hence, this enables the dispersing agent to be used in a small amount or the dispersing agent not to be used.

Then, the pigment ink as described above comes into contact with the liquid composition of the present invention described previously, whereupon the pigment agglomerates or precipitates immediately by, e.g., the action of salting out of polyvalent metal ions present in the liquid composition, so that the coloring material in the pigment ink can be fixed to the recording medium at a higher speed. As the result, even where two or more kinds of inks with different colors are adjoiningly applied to the recording medium, the color bleeding can not easily come about, as so presumed. In the first embodiment of the present invention, it is preferable to use an ink-jet recording liquid composition which causes reaction upon its contact with the ink. As to the "reaction" between the ink and the liquid composition as herein referred to, the change that the state of dispersion of pigment becomes unstable on the basis of the action as stated above is also included in the "reaction".

In the case when the dye is used as the coloring material making up the ink used in the first embodiment, it is preferable to use a water-soluble dye. Dyes such as a direct dye, an acid dye, a basic dye and a disperse dye may be used, for example. As a preferable ink which contains the dye, an ink may preferably be used in which ink the dye runs at a high speed to become fixed to the recording medium as a result of contact with the liquid composition of the present invention, made up as described previously. As how it acts, there can be the deposition of dye that is due to the effect of salting out, the formation of a slightly water-soluble or water-insoluble salt or compound that is due to the reaction between the polyvalent metal ions and the dye, or the composite action of these, which all take place upon contact with the liquid composition.

As a dye usable in the ink capable of causing such action, a dye may preferably be used which has at least one carboxyl group in the molecule. This is because the use of such a dye facilitates its reaction with the polyvalent metal salt present in the liquid composition to form the water-insoluble salt or compound, when it comes into contact with the liquid composition of the present invention. Stated more specifically, it is preferable to use any of dyes having structures as enumerated below as Exemplary Compounds 1 to 30. In the present invention, examples are by no means limited to these. Letter symbol M in Exemplary Compounds 1 to 5 represents any of an alkali metal, ammonium and organic ammonium.

Exemplary Compound 1

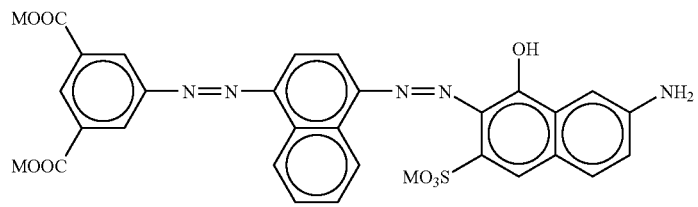

Exemplary Compound 2

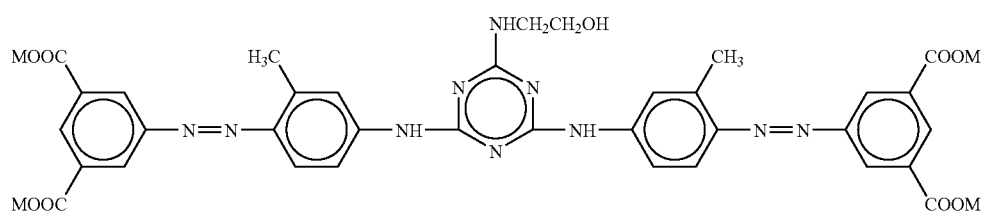

Exemplary Compound 3

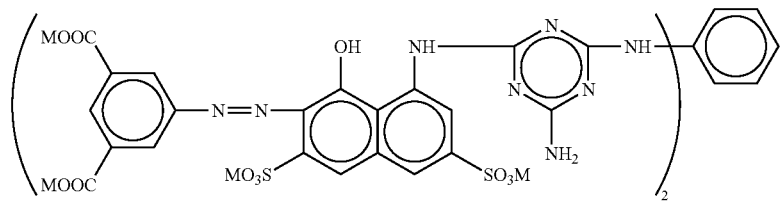

-continued
Exemplary Compound 4
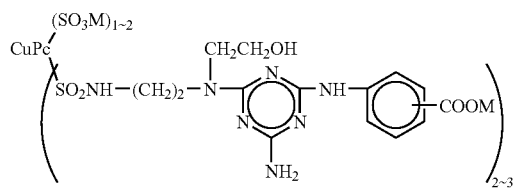
Exemplary Compound 5
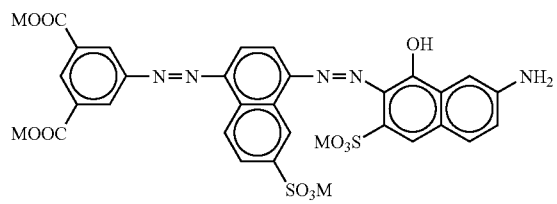
Exemplary Compound 6
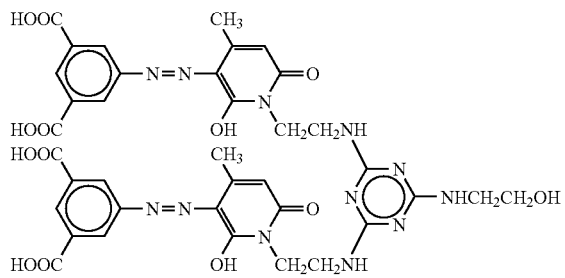
Exemplary Compound 7
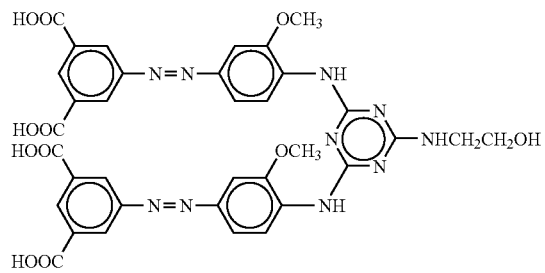
Exemplary Compound 8
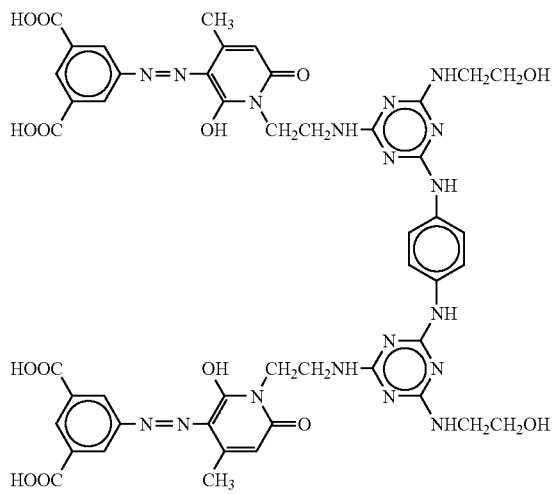
Exemplary Compound 9
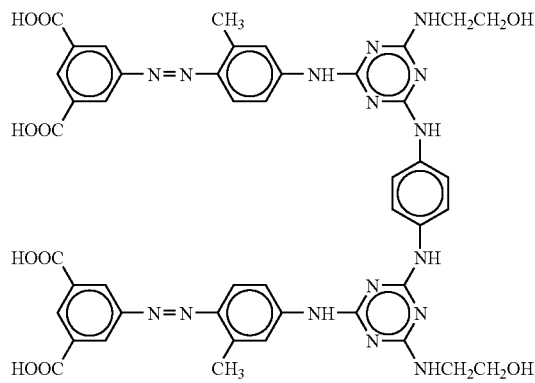
Exemplary Compound 10
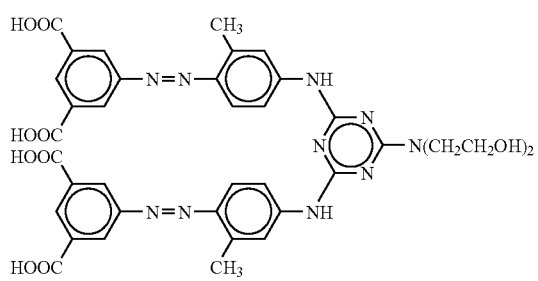
Exemplary Compound 11
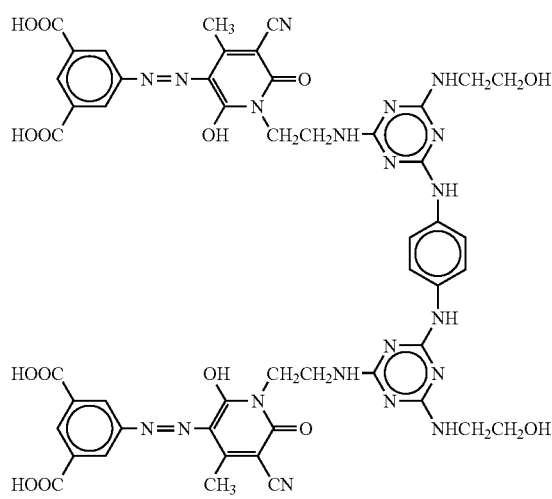

-continued
Exemplary Compound 12
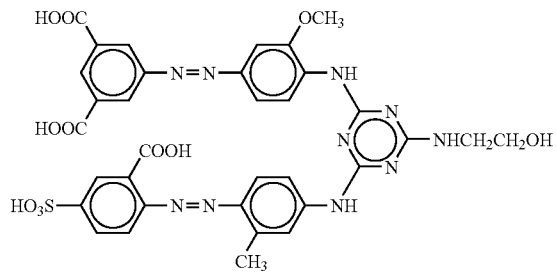
Exemplary Compound 13
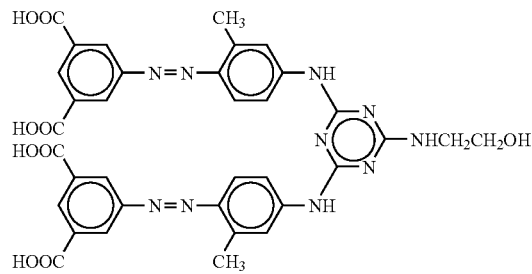
Exemplary Compound 14
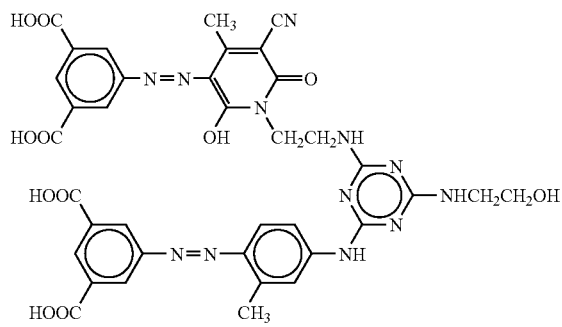
Exemplary Compound 15
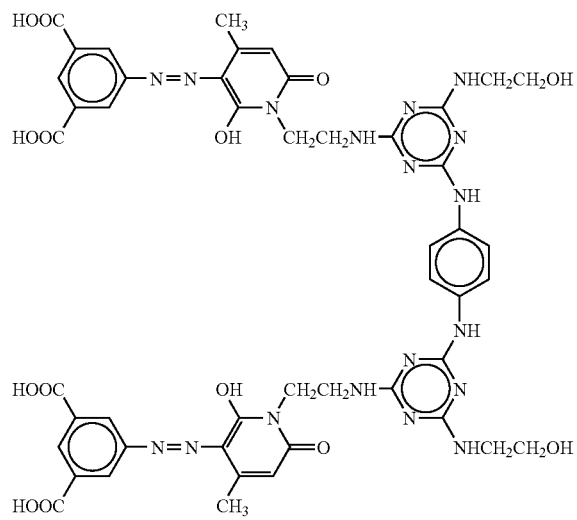
Exemplary Compound 16
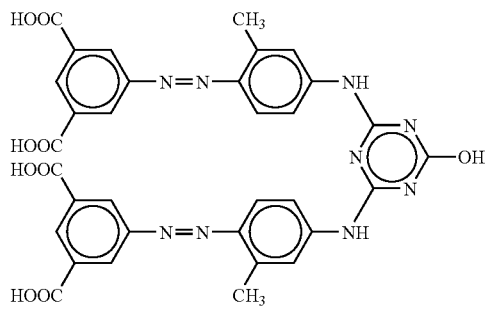
Exemplary Compound 17
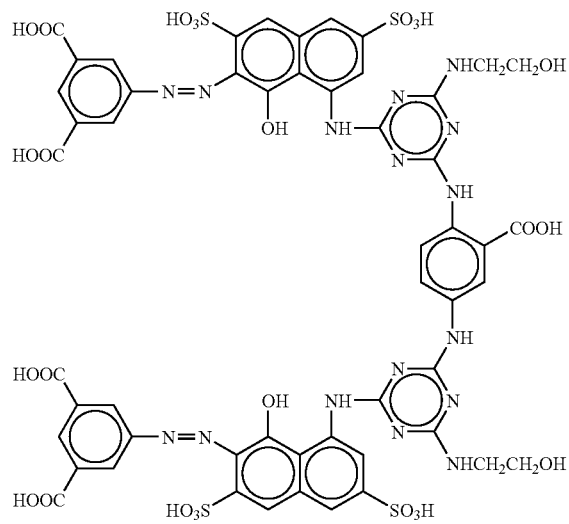

-continued
Exemplary Compound 18
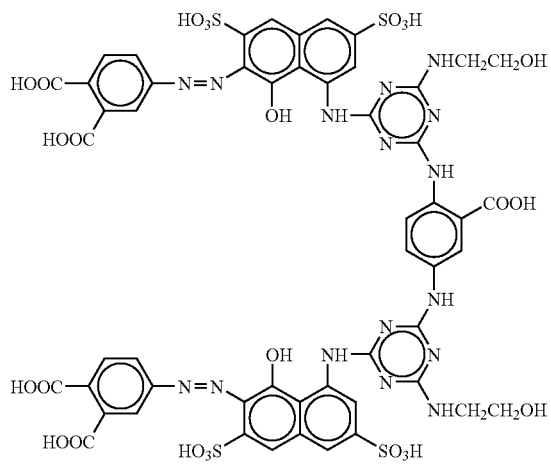
Exemplary Compound 19
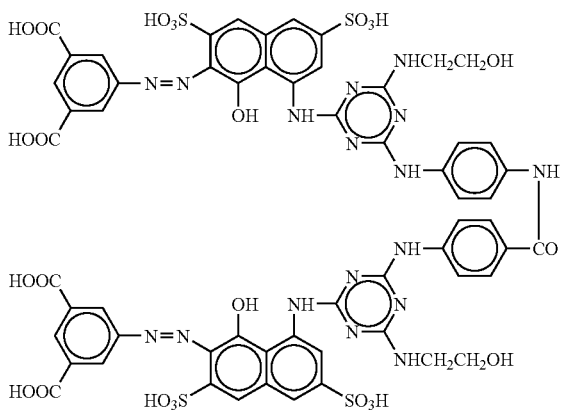
Exemplary Compound 20
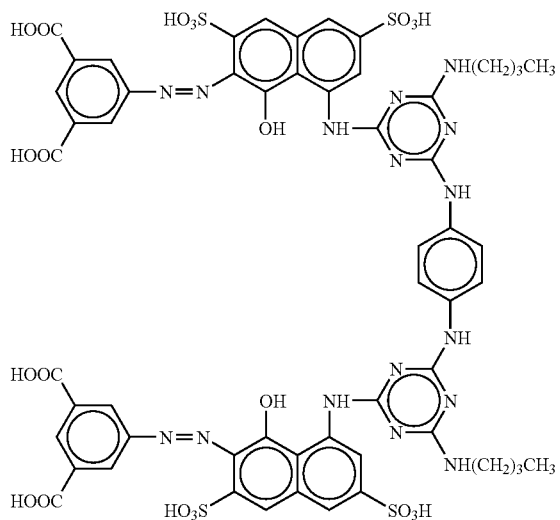
Exemplary Compound 21
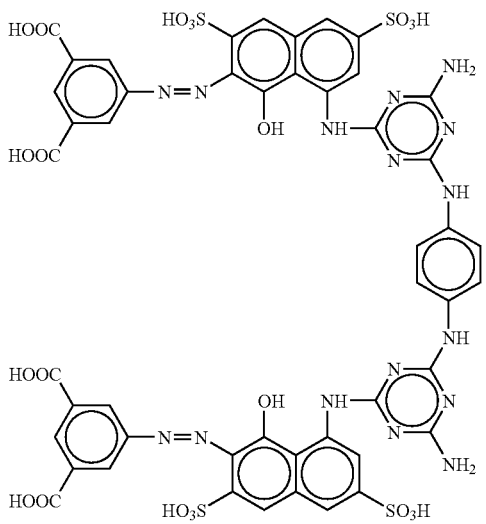
Exemplary Compound 22
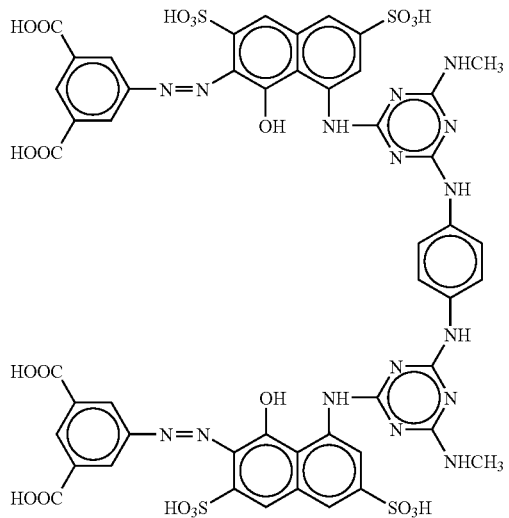
Exemplary Compound 23
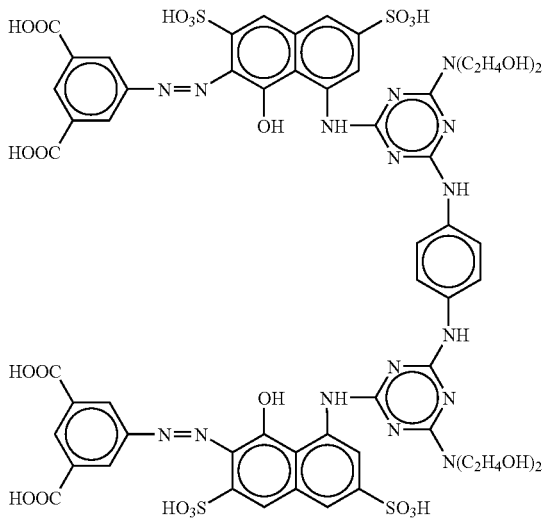

Exemplary Compound 24

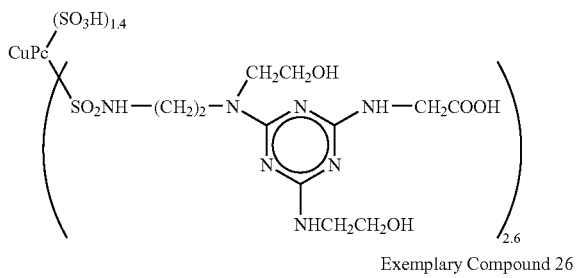

Exemplary Compound 26

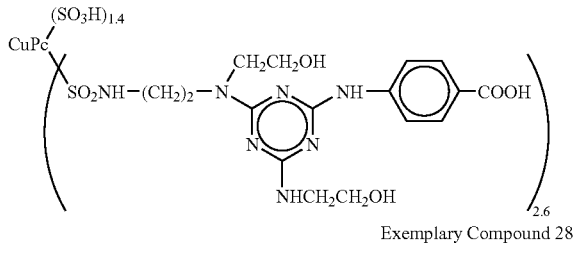

Exemplary Compound 28

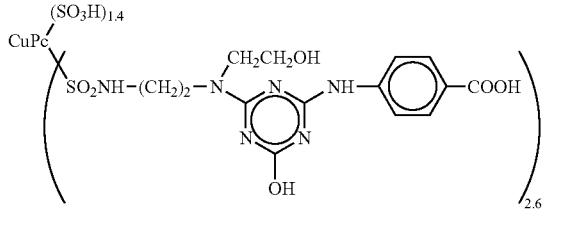

Exemplary Compound 30

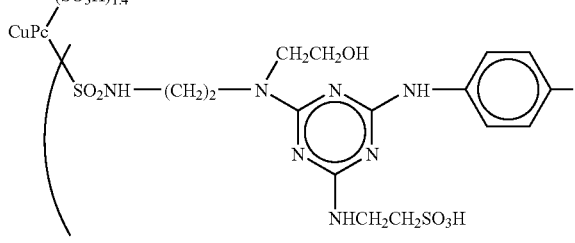

Exemplary Compound 25

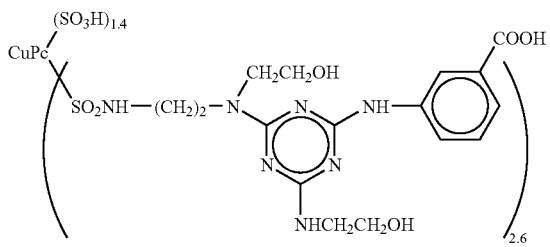

Exemplary Compound 27

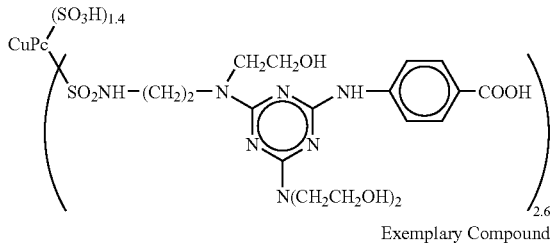

Exemplary Compound 29

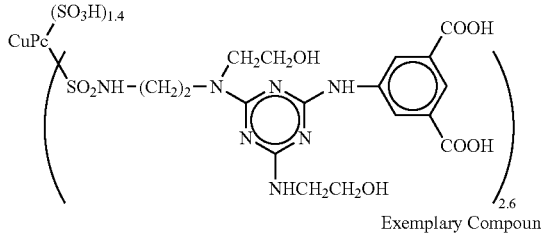

As the coloring material to be contained in the ink used in the first embodiment, the dye as enumerated above or the pigment described previously may be used alone or may be used in combination of two or more. As to the coloring material concentration of any of these dyes and pigments in the ink, there are no particular limitations thereon. The coloring material may usually be used in an amount selected appropriately within the range of from 0.1% by mass to 20% by mass based on the total mass of the ink.

The liquid medium used in the liquid composition of the present invention and in the ink used in combination with the former is described below. As the liquid medium, a mixed medium may preferably be used which makes use of water and a water-soluble organic solvent in combination. As the water used in this case, it is desirable to use not usual water containing various ions, but deionized water. The water may preferably be in a content ranging from 35% by mass to 96% by mass based on the total mass of the ink.

The water-soluble organic solvent is used for various purposes of, e.g., adjusting the viscosity of ink to a suitable viscosity preferable for use to lower the drying rate of the ink, and improving the solubility of coloring material to prevent recording head nozzles from clogging. As a specific water-soluble organic solvent to be used, those enumerated below may be used, for example. It may include alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or ketoalcohols such as acetone and diacetone alcohols; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols whose alkylene groups have 2 to 6 carbon atoms, such as ethylene glycol, propylene glycol, trimethylene glycol, triethylene glycol and 1,2,6-hexanetriol; glycerol; trimethylol ethane and trimethylol propane; lower alkyl ethers such as ethylene glycol monomethyl(or -ethyl) ether, diethylene glycol methyl(or ethyl) ether and triethylene glycol monomethyl(or -ethyl) ether; lower dialkyl ethers of polyhydric alcohols, such as triethylene glycol dimethyl (or -ethyl) ether and tetraethylene glycol dimethyl(or -ethyl) ether; alkanolamines such as monoethanolamine, diethanolamine and triethanolamine; and sulfolane, N-methyl-2-pyrrolidone, 2-pyrrolidone, and 1,3-dimethyl-2-imidazolidinone. The water-soluble organic solvent as described above may be used alone or in the form of a mixture.

A pH adjuster may also be incorporated in the ink in order to make the pH value of ink constant to make stable the solubility of dye and dispersibility of pigment in the ink. As the pH adjuster, stated specifically, those enumerated below may be used, for example. It may include inorganic acids such as nitric acid, sulfuric acid and hydrochloric acid; carboxylic acids such as acetic acid, propionic acid, lactic acid, malic acid, citric acid, gluconic acid, oxalic acid, malonic acid, succinic acid, glutaric acid, adipic acid and pimelic acid; hydroxides such as lithium hydroxide, sodium hydroxide, potassium hydroxide and ammonium hydroxide; sulfates such as lithium sulfate, sodium sulfate, potassium sulfate and ammonium sulfate; carbonates such as lithium carbonate, sodium carbonate, sodium hydrogencarbonate, potassium carbonate, potassium hydrogencarbonate, ammonium carbonate and ammonium hydrogencarbonate; acetates such as lithium acetate, sodium acetate, potassium acetate and ammonium acetate; and hydrochlorides.

Any of these pH adjusters may be added to the liquid composition of the present invention. Any of these may otherwise be used in the state it is added alone in the liquid composition and in the ink. More preferably, it may be used in combination of two or more pH adjusters selected appropriately. In particular, in order to keep the pH stably, improve the dissolution stability of the water-soluble dye contained in the ink and prevent problems such as nozzle clogging, these pH adjusters may preferably be added in an amount ranging from 0.1% by mass to 10% by mass, and more preferably from 1% by mass to 8% by mass.

Besides the foregoing components, in the liquid composition of the present invention and in the ink to be used in combination with the former, conventionally known commonly available various additives may further optionally appropriately be used in combination, as exemplified by a viscosity modifier, a mildew-proofing agent, an anticeptic, an antioxidant, an antifoaming agent, and a nozzle drying preventive agent such as urea.

As preferable ranges of physical properties of the liquid composition of the present invention and those of the ink to be used in combination with the former, values at about 25° C. may preferably be within the following ranges. As pH value, it may preferably be from 3 to 12, and more preferably from 4 to 10. As surface tension, it may preferably be from 10 to 60 mN/m (dyn/cm), and more preferably from 15 to 50 mN/m (dyn/cm). As viscosity, it may preferably be from 1 to 30 mPs·s (cps), and more preferably from 1 to 10 mPs·s (cps).

In the ink-jet recording process according to the first embodiment of the present invention, the liquid composition of the present invention and the ink made up as described above are used in combination, and these are so made up as to be ejected in such a way that they come into contact with each other on a recording medium to form images thereon and make the both react with each other. There are no particular limitations on the recording medium used here. However, in the ink-jet recording process according to the first embodiment, the effect of lessening the color bleeding is brought out especially where images are formed on what is called plain paper such as copying paper and bond paper, having conventionally been used. Accordingly, such paper may preferably be used.

The ink-jet recording process according to the first embodiment may be of any system without any particular limitations as long as it is of a system in which the ink and the liquid composition are provided with energy necessary for their ejection to eject droplets of these onto the recording medium to form images thereon. However, especially where the present invention is applied to a case in which an ink-jet recording process of a system making use of heat energy in ejecting the ink is used, an advantageous effect as stated below is obtainable. That is, the use of such an ink-jet recording process to form images brings an advantageous effect that the outermost surface protective layer on the heater can effectively be kept from melting. Such an ink-jet recording system making use of heat energy may include, e.g., what is called an on-demand type BUBBLE JET (registered trademark of CANON INC.) system, in which droplets are ejected by using air bubbles produced by heat energy.

In the ink-jet recording process according to the first embodiment of the present invention, the process may at least be so set up that the liquid composition of the present invention and the ink are used in combination and these are so applied onto the recording medium as to be brought into contact and reaction with each other thereon to perform recording. Accordingly, the order in which the liquid composition and the ink are applied onto the recording medium when images are formed thereon may be either of the order in which the liquid composition is first applied and the order in which the ink is first applied. More specifically, in the first embodiment, without regard to the order or way of applying these, either order may be employed as long as the liquid composition and the ink are applied onto the recording medium in such a way that the state of contact of the both is formed thereon. Doing in this way brings achievement of good print quality level of images formed by the ink, and improvements in fixability and water resistance of the images and in the effect of preventing the color bleeding. This is presumed due to the following: The liquid composition made up as described above comes into contact with the ink on the recording medium, whereupon the polyvalent metal ions coming from the polyvalent metal salt making up the liquid composition are mixed with the pigment or dye contained in the ink, and this causes agglomeration, precipitation, or thickening of the ink.

In particular, from the viewpoint of more improving the density and fixability of images, it is more preferable that, e.g., the ink is applied first and thereafter the liquid composition is applied, and further subsequently thereto the ink is again applied. Instead, the ink may be applied onto a recording medium after the liquid composition has been applied onto the recording medium and further the liquid composition may be applied onto the recording medium.

In the case when the liquid composition is applied before the ink is applied, there are no particular limitations on the time for which the liquid composition is first made to adhere to the recording medium and thereafter the ink is made to adhere thereto. In order to make the present invention more effective, such time may be set within few seconds, and particularly preferably within 1 second. The same also applies to the case when the liquid composition and the ink are applied onto the recording medium in reverse order. Further, as another embodiment for applying the liquid composition and the ink onto the recording medium, a method shown in FIG. 16 may also be used. In such an embodiment, a liquid composition 804 and an ink 805 are ejected from recording heads 801 and 802, respectively, of an ink-jet recording apparatus, and the both are mixed immediately after their ejection to apply a mixture 806 of these onto a recording medium 803.

Thus, by the ink-jet recording process according to the first embodiment of the present invention, an advantageous effect as stated below is obtainable without regard to the order or way in which the liquid composition and the ink are applied.

That is, applying the liquid composition of the present invention (made up of specific constituents) onto the recording medium in such a way that the state of contact with the ink is formed thereon brings achievement of good print quality level of images formed by the ink, and improvement in fixability and water resistance of the images. Further, the color bleeding can effectively be kept from occurring when color images are formed. It is presumed that such advantageous effects can be obtained as a result of the formation of aggregates that is due to the fact that the polyvalent metal ions contained in the liquid composition and the pigment and/or dye contained in the ink are mixed on the recording medium.

In the first embodiment of the present invention, in the case when the liquid composition and the ink are applied onto the recording medium by the above method to perform recording, the amounts of the ink and liquid composition applied, per unit area on the recording medium in its image-formed regions, may preferably be in a ratio set in the following way. That is, this ratio may be 1:1, which may also be ink:liquid composition=10:1 to 10:10. Here, the ratio between the amounts of the ink and liquid composition applied, per unit area on the recording medium in its image-formed regions may specifically be controlled in the following way. For example, a method is available in which, when the liquid composition and the ink are applied onto the recording medium, the number of pixels formed of the liquid composition to be made to adhere onto the recording medium is so controlled as to be within the range of from 10% to 100% of the number of pixels formed of the ink that is to adhere onto the recording medium. Another method is also available in which, when the liquid composition and the ink are applied onto the recording medium, the amount of the liquid composition to be ejected is so controlled as to be smaller than the amount of the ink to be ejected. Besides, such control may be made in combination of the above methods, i.e., the amount of the liquid composition to be ejected is so controlled as to be smaller than the amount of the ink to be ejected and also the number of pixels formed of the liquid composition to be made to adhere onto the recording medium is set within the range of from 10% t0 100% of the number of pixels formed of the ink that is to adhere onto the recording medium.

The ink-jet recording process according to the first embodiment and an ink-jet recording apparatus making use of such a process are described below in greater detail. In the first embodiment, as the method by which the liquid composition of the present invention and the ink are made to adhere onto the recording medium, an ink-jet recording process is used in which the ink is provided with energy to thereby eject the ink onto the recording medium to form images thereon. As the ink-jet recording process, any of conventionally known various ink-jet recording systems may be used, as exemplified by an ink-jet recording system that utilizes mechanical energy produced by the deformation of a piezoelectric element.

As stated previously, the remarkable effect is obtained in the case of the embodiment employing the liquid composition of the present invention in the ink-jet recording process in which the action of heat energy is utilized to eject the ink. That is, as discussed previously, peculiar problems as stated below may come about when the liquid composition containing the polyvalent metal salt is used in combination with the ink in order to keep color-mix blotting (color bleeding) from occurring between different colors and to improve the water resistance of recorded images. Stated specifically, the problems of wire break of the heater and ejection disability of a polyvalent metal solution (the liquid composition) may come about when images are formed by using the ink-jet recording process that utilizes heat energy in ejecting the liquid composition. To cope with this matter, the present inventors have made extensive studies on how the liquid composition and ink be composed that can keep the heater from wire breaking or scorching to achieve long-lifetime service of the recording head. As the result, they have accomplished the present invention. As stated previously, one object of the present invention is to provide the liquid composition which can give images having a good print quality level and also can achieve long-lifetime service of the ink-jet recording head, in the ink-jet recording process in which the liquid composition and the ink are made to adhere to the recording medium to perform recording thereon.

The above object can effectively be achieved by the ink-jet recording process characterized by the use of the liquid composition of the present invention. Further, although any conventional processes has had a problem as stated below, the use of the liquid composition of the present invention can also effectively prevent such a problem. The liquid composition is used in combination with the ink in order to keep the color bleeding from occurring and to improve the water resistance of recorded images. However, because of the liquid composition that is repeatedly ejected from the recording head, the outermost surface protective layer may melt which is formed on the heater (a heat generating element substrate member) for providing the liquid composition with heat energy and is formed of a metal and/or a metal oxide. Then, it has come about that this causes wire break of the heater to bring about a situation that the ejection comes disable, to affect the quality of images to be formed. Incidentally, as the above metal and/or the metal oxide, tantalum or an oxide of tantalum may be used, for example.

As the ink-jet recording apparatus characterized by the use of the liquid composition of the present invention described above, the following embodiments are available. The apparatus may include an apparatus carrying a liquid composition holder which holds the above liquid composition, an ink holder which holds the ink, and an ink-jet recording head having recording heads for respectively ejecting therefrom the liquid composition and the ink. Further, in another preferred embodiment, the apparatus may be an ink-jet recording apparatus which ejects the liquid composition and the ink by the action of heat energy, which may include what is made up as described below, i.e., an ink-jet recording apparatus having a recording head having a heater which provides the liquid composition or the ink with heat energy when it is present in its channel led from a liquid composition or ink holder, and a means which applies pulsewise electric signals to the heater in accordance with recording information. In a still further embodiment, the apparatus may be an ink-jet recording apparatus characterized in that the above heater has an outermost surface protective layer containing a metal and/or a metal oxide. Then, in particular, the remarkable effect of the present invention is especially brought out in the case of an ink-jet recording apparatus which is so embodied that the metal and/or the metal oxide is/are tantalum and/or an oxide of tantalum.

Further, as an embodiment by which the remarkable effect of the present invention is brought out, an ink-jet recording apparatus may be set up in which the energy to be given to the heater is controlled in the following way. That is, the remarkable effect of the present invention is especially brought out according to an ink-jet recording apparatus in which the value of $E_{op}/E_{th}$ (=γ value) has been so controlled as to satisfy the following relationship. Here, the amount of energy given to the heater in order to eject the liquid composition from the recording head is represented by $E_{op}$, and the amount of minimum energy given that is necessary for ejecting the ink from the recording head is represented by $E_{th}$.

$$1.10 \leq E_{op}/E_{th} \leq 1.82.$$

Figure 2:
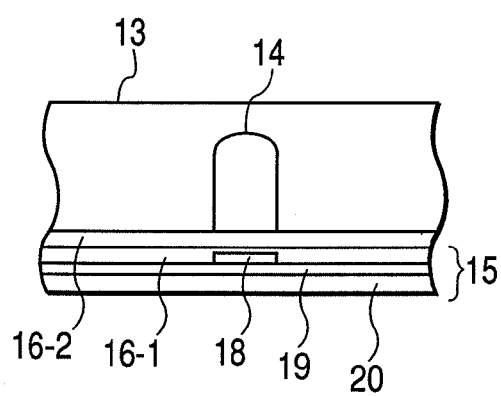
FIG. 2 is a transverse sectional view showing the above recording head of the ink-jet recording apparatus of the present invention.

An ink-jet recording apparatus making use of the ink-jet recording process in which the ink is ejected by utilizing heat energy is described below with reference to the drawings. An example of how a recording head is made up is shown in FIGS. 1 and 2 which is the main constituent of the ink-jet recording apparatus which utilizes heat energy. FIG. 1 is a cross-sectional view of a recording head 13 along its ink channel, and FIG. 2 is a cross-sectional view along the line 2-2 in FIG. 1. The recording head 13 is obtained by bonding a glass, ceramic, silicon, polysulfone or plastic plate or the like having a channel (nozzle) 14 through which the ink is passed, to a heating element substrate member 15. As shown in FIGS. 1 and 2, the heating element substrate member 15 usually has structure as described below. It has a protective layer 16-1 formed of silicon oxide, silicon nitride, silicon carbide or the like, and an outermost surface protective layer 16-2 formed of a metal such as platinum or a metal oxide such as a platinum oxide, in particular, tantalum or a tantalum oxide. It also has electrodes 17-1 and 17-2 formed of aluminum, gold, an aluminum-copper alloy or the like, and a heating resistor layer 18 formed of a high-melting material such as hafnium boride, tantalum nitride or tantalum aluminum. It still also has a heat accumulating layer 19 formed of silicon oxide, aluminum oxide or the like, and a substrate 20 formed of a material having good heat dissipation properties, such as silicon, aluminum, aluminum nitride or the like.

In the ink-jet recording apparatus which utilizes heat energy, having the heating element substrate member 15 structured as described above, small droplets of liquid fly toward a recording medium in such a way as described below. Upon application of pulsewise electric signals to the electrodes 17-1 and 17-2 of the recording head 13, heat is abruptly generated at the region (heater) denoted by n in the heating element substrate member 15, so that bubbles are generated in ink 21 kept in contact with the surface of this region. Then, the pressure thus produced thrusts out a meniscus 23 and the ink 21 is ejected through the nozzle 14 of the recording head 13 and from an ejection orifice 22 in the form of ink droplets 24 to fly toward a recording medium 25.

Figure 3:
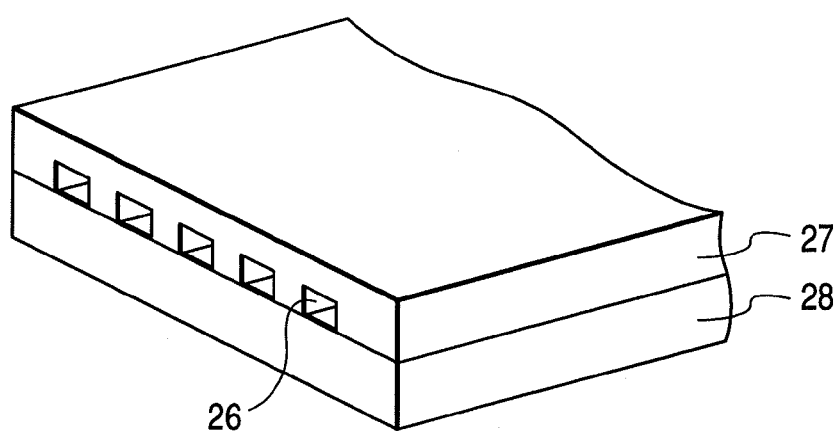
FIG. 3 is a perspective view of the external appearance of a recording head in which the recording head shown in FIG. 1 is set multiple.

FIG. 3 shows external appearance of an example of a multi-head (multiple recording head) having the recording head shown in FIG. 1, arranged in a large number. This multi-head is made by bonding a glass plate 27 having a multi-nozzle 26, to a heating head 28 similar to what is illustrated in FIG. 1.

Amount of Energy Given to Heater

The γ value is explained next. The γ value refers to a factor representing the ratio of the energy given actually, to the critical energy that barely enables ejection of the ink or liquid composition. More specifically, where the width of a pulse applied to a bubble jet head (when a plurality of pulses are dividedly applied, their total width) is represented by P, the voltage applied is represented by V and the resistance of the heater is represented by R, the energy given, E, is expressed by the following equation (A).

$$E = P \times V^2 / R \quad \text{(A)}.$$

At this time, where the energy to heater that is minimally necessary at which energy the bubble jet head can barely eject the ink or liquid composition is represented by $E_{th}$ and the energy given when the head is actually driven is represented by $E_{op}$, the γ value is given by the following equation (B).

$$\gamma = E_{op}/E_{th} \quad \text{(B)}.$$

Then, as a method by which a γ value that is preferable when, e.g., the liquid composition is ejected is found from driving conditions of the bubble jet head, the following two methods (1) and (2) are employed in practical use.

(1) Case in which Pulse Width Stands Fixed

First, a suitable voltage at which the bubble jet head ejects the liquid composition is found out to drive the head at a given pulse width. Next, the voltage is gradually made lower, and the voltage at which the ejection of the liquid composition stops is found out, where the minimum voltage just before this voltage and at which the ejection is possible is represented by $V_{th}$. When the voltage used actually in the driving is represented by $V_{op}$, the γ value is found from the following equation (C).

$$\gamma = (V_{op}/V_{th})^2 \quad \text{(C)}.$$

(2) Case in which Voltage Stands Fixed

First, a suitable pulse width at which the bubble jet head ejects the liquid composition is found out to drive the head at a given voltage. Next, the pulse width is gradually made shorter, and the pulse width at which the ejection of the liquid composition stops is found out, where the minimum pulse width just before this pulse width and at which the ejection is possible is represented by $P_{th}$. When the pulse width used actually in the driving is represented by $P_{op}$, the γ value is found from the following equation (D).

$$\gamma = P_{op}/P_{th} \quad \text{(D)}.$$

The voltage value given here is the voltage applied actually to the heater part in order to make the heater of the bubble jet head generate heat. The voltage applied from the outside of the bubble jet head may drop at contacts, wiring resistances and so forth, and hence the above methods can not be used for calculating the γ value in its strict sense. However, where the voltages $V_{th}$ and $V_{op}$ are measured from the outside of the head, some variations of these voltages are measured in the state they are included in both the values. Hence, as long as some variations of the voltages are not large, errors can be small even when the γ value is calculated by using these values directly. Thus, the value thus found may expediently be used as the γ value.

A plurality of heaters are driven when the recording is performed using an actual printer. Accordingly, it is necessary to mind a possibility that the voltage applied to one heater is thereby affected to vary. Further, from the above equations (A) and (B), the square of V and the P may seem to be inversely proportional to each other. In fact, however, the square of V and the P have no simple relation between them because there are such problems as stated below. That is, there are an electrical problem that, e.g., the pulse wave form can not be rectangular, a thermal problem that, e.g., a difference in pulse wave form brings about a difference in diffusion of heat around the heater, and a problem peculiar to bubble jet recording such that a difference in voltage brings about a difference in heat flux transferred from the heater to the ink, to change the state of bubbling. Accordingly, the methods described above in (1) and (2) must be handled independently from each other, and it is necessary to mind that the converting of one value into the other value by calculation may be the cause of errors. In the present invention, the value found by the method in (1) is employed as the γ value unless particularly noted.

For the purpose of stable ejection of the ink or liquid composition, it is common to drive the ink-jet recording apparatus under conditions that the γ value found as above comes to approximately from 1.12 to 1.96. However, in the first embodiment in which the liquid composition made up as described previously is provided with heat energy so as to be ejected from the recording head, it is preferable to drive the ink-jet recording apparatus under conditions that the γ value comes to from 1.10 to 1.82. Doing in this way can prevent i) scorches from sticking to the heater which are caused when the liquid composition made up as described above is ejected and ii) the metal of the outermost surface protective layer from melting when the ink or liquid composition is overheated, and furthermore can achieve much longer lifetime of the recording head.

When the γ value at the time the liquid composition of the present invention is provided with heat energy so as to be ejected from the recording head is within the above range, the scorches can especially effectively prevented from sticking to the heater, so that the recording head can achieve long-lifetime service. The reason therefor is unclear, and the present inventors presume it as stated below. Firstly, inasmuch as the ink-jet recording apparatus is so driven that the γ value is within the above range, the component-(b) cryptand contained in the liquid composition of the present invention protects the outermost surface protective layer of the heater. As the result, the metal and/or oxide of the metal which make(s) up the outermost surface protective layer can effectively be prevented from melting, as so presumed.

Figure 4:
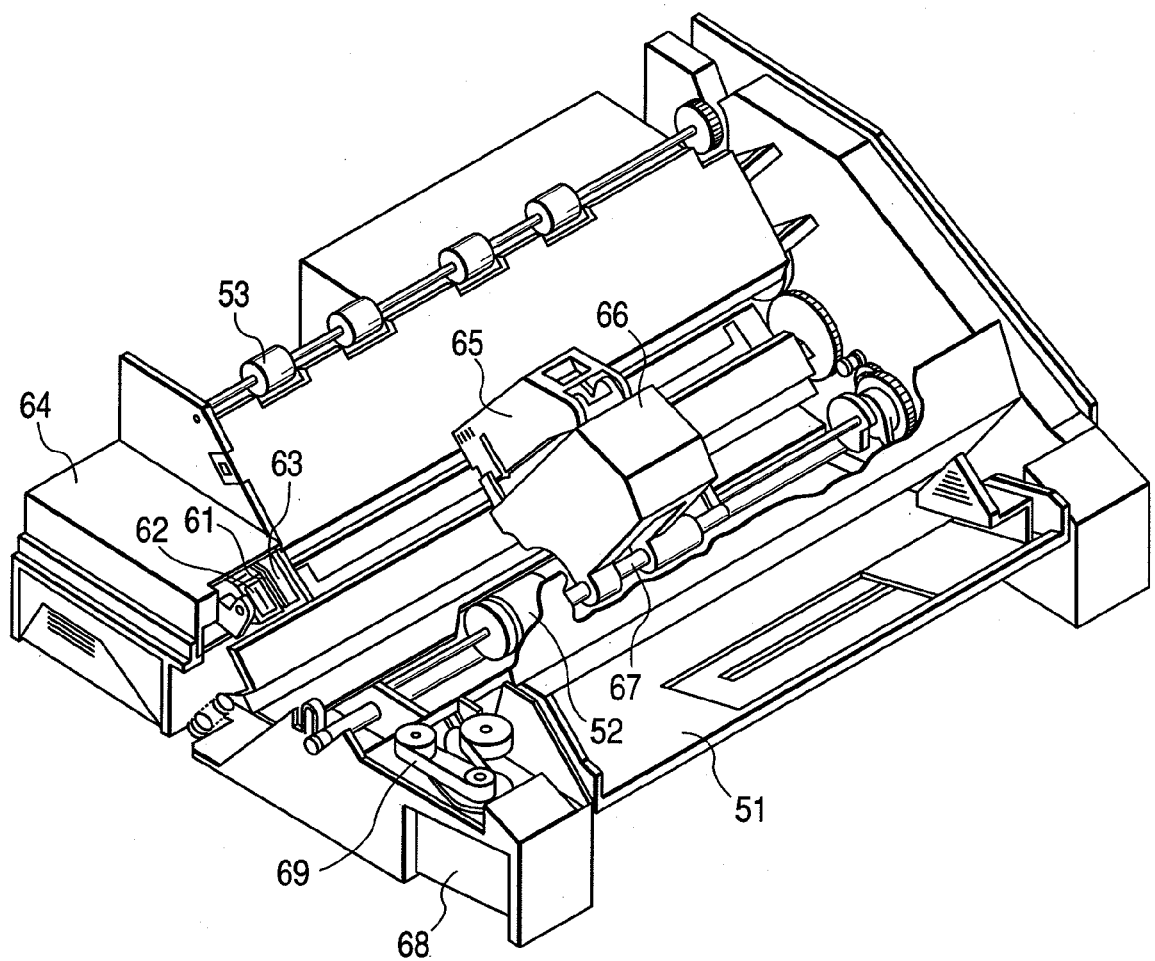
FIG. 4 is a schematic perspective view showing an example of the ink-jet recording apparatus of the present invention.

FIG. 4 shows an example of the ink-jet recording apparatus in which the recording head described previously has been incorporated. In FIG. 4, reference numeral 61 denotes a blade serving as a wiping member, which is in the form of a cantilever one end of which is a stationary end retained by a blade-retaining member. The blade 61 is provided at the position adjacent to the region in which a recording head 65 performs recording. In the example shown in the drawing, the blade 61 is retained in such a form that it projects to the course through which the recording head 65 is moved.

Reference numeral 62 denotes a cap for the face of ejection orifices of the recording head 65, which is disposed at the home position adjacent to the blade 61, and is so constructed that it moves in the direction perpendicular to the direction of movement of the recording head 65, and comes into contact with the face of ejection orifices to carry out capping. Further, reference numeral 63 denotes an ink absorber provided adjoiningly to the blade 61, and, like the blade 61, is retained in such a form that it projects to the course through which the recording head 65 is moved. The above blade 61, cap 62 and absorber 63 make up an ejection restoration assembly 64, where the blade 61 and the absorber 63 remove water, dust and so forth from the ejection orifice face.

Reference numeral 65 denotes the recording head having an ejection energy generating means and ejects the liquid composition and the ink to the recording medium set opposingly to the ejection orifice face provided with ejection orifices, to perform recording. Reference numeral 66 denotes a carriage on which the recording head 65 is carried so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide shaft 67 and hence the recording head 65 can be moved from a recording region to a region adjacent thereto.

Reference numeral 51 denotes a feeding part from which recording mediums are inserted, and, 52, a paper feed roller driven by a motor (not shown). With such make-up, the recording medium is fed to the position opposing to the ejection orifice face of the recording head 65, and, with progress of recording, put out to a paper delivery section provided with a paper delivery roller 53.

In the above make-up, the cap 62 of the ejection restoration assembly 64 is receded from the moving course of the recording head 65 when the recording head 65 is returned to its home position after completion of recording, and the blade 61 stands projected to the moving course. As the result, the ejection orifice face of the recording head 65 is wiped.

When the cap 62 comes into contact with the ejection orifice face of the recording head 65 to carry out capping, the cap 62 is moved in such a way that it projects to the moving course of the recording head. When the recording head 65 is moved from its home position to the position at which the recording is started, the cap 62 and the blade 61 are at the same position as the above position where the ejection orifice face is wiped. As the result, the ejection orifice face of the recording head 65 is wiped also at the time of this movement.

The above movement of the recording head to its home position is made not only at the time of the completion of recording or restoration of ejection, but also when the recording head is moved over recording regions for the purpose of recording, during which it is moved to the home position adjacent to each recording region at given intervals, where the ejection orifice face is wiped in accordance with this movement.

Figure 5:
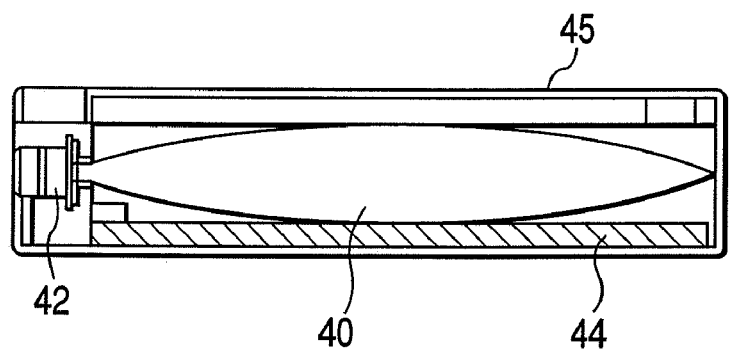
FIG. 5 is an internal structure perspective view showing an example of an ink cartridge.

FIG. 5 is a view showing an example of an ink cartridge 45 that has held therein, e.g., the ink being fed to the recording head through an ink-feeding member, e.g., a tube. Here, reference numeral 40 denotes an ink holder, e.g., an ink bag, having held therein the feeding ink. The top thereof is provided with a stopper 42 made of rubber. A needle (not shown) may be inserted to this stopper 42 so that the ink in the ink bag 40 can be fed to the head. Reference numeral 44 denotes an absorber that receives a waste ink. It is preferable for the ink holder to be formed of a polyolefin, in particular, polyethylene, at its face coming into liquid contact with ink.

Figure 6:
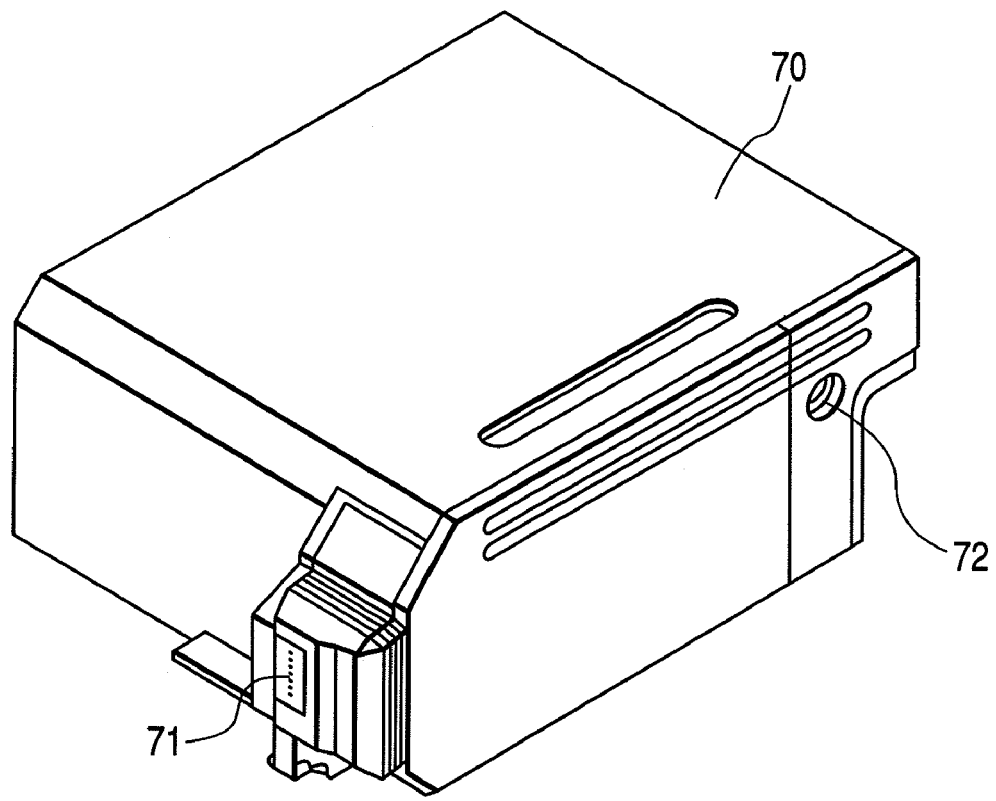
FIG. 6 is a perspective view showing an example of a recording unit.
Figure 7:
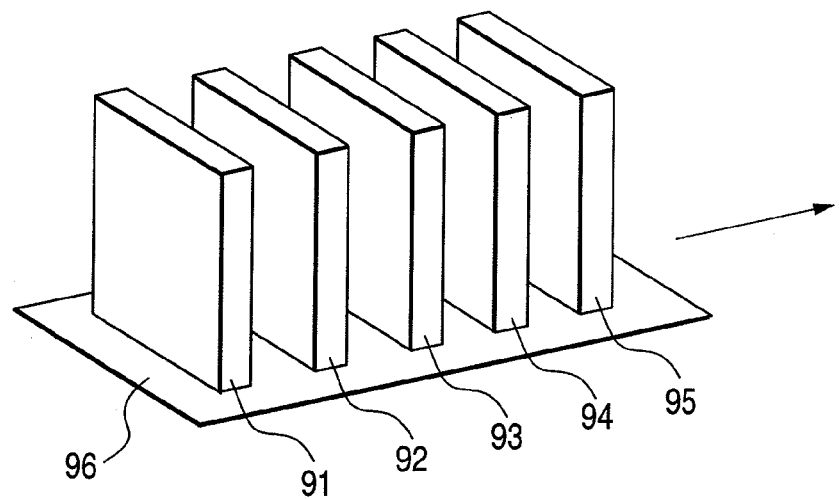
FIG. 7 is a perspective view showing a multiple recording head where a plurality of recording heads are arranged.

The ink-jet recording apparatus according to the first embodiment is not limited to the apparatus as described above in which the recording head and the ink cartridge are separately provided, and is preferably usable also in a device in which these are integrally formed as shown in FIG. 6. In FIG. 6, reference numeral 70 denotes a recording unit, in the interior of which an ink holder that has held an ink, e.g., an ink absorber, is received. This recording unit is so constructed that the ink in such an ink absorber is ejected in the form of ink droplets from a head 71 having a plurality of orifices. As a material for the ink absorber, polyurethane may preferably be used. In place of the ink absorber, the recording unit may be so constructed that the ink holder is an ink bag provided internally with a spring or the like. Reference numeral 72 denotes an air path opening through which the interior of the cartridge is made to communicate with the atmosphere. This recording unit 70 is one used in place of the recording head 65 shown in FIG. 4, and is detachably mountable to the carriage 66.

Where color images are formed by the ink-jet recording process according to the first embodiment, an ink-jet recording apparatus is used in which, e.g., the recording head shown in FIG. 3 is set in fives, which are arranged on a carriage 96 to make up a multiple recording head. FIG. 7 shows an example of such a multiple recording head. Reference numerals 91, 92, 93 and 94 denote recording heads for ejecting therefrom a yellow ink, a magenta ink, a cyan ink and a black ink, respectively. Reference numeral 95 denotes a head for ejecting therefrom the liquid composition. This multiple recording head is disposed in the above ink-jet recording apparatus, and the inks with respective colors are ejected in accordance with recording signals while the carriage 96 is moved in the direction of an arrow. The liquid composition is, e.g., before the inks with respective colors are ejected, kept to adhere to the recording medium at its image forming areas to which at least the inks are to adhere.

Figure 8:
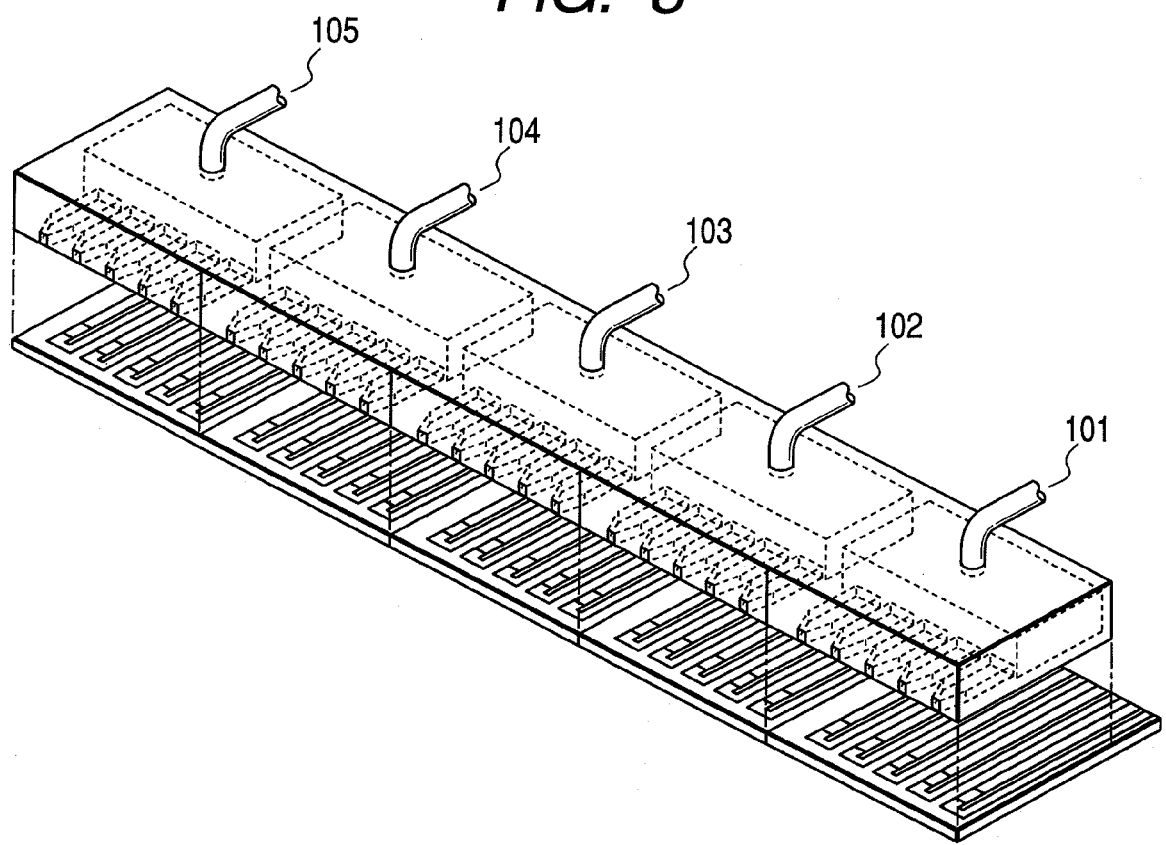
FIG. 8 is a perspective view showing another recording head used in the present invention.

An example where five recording heads are used in combination to make up a multiple recording head is shown in FIG. 7. Without limitation thereto, a case is also preferable in which, as shown in FIG. 8, in a single recording head, a plurality of fluid channels for yellow 101, magenta 102, cyan 103, black 104 and liquid composition 105 are dividedly provided to carry out the color image formation. Of course, the individual recording heads may also be so arranged that the order of recording for the respective inks and liquid composition is in reverse to the above order.

Figure 9:
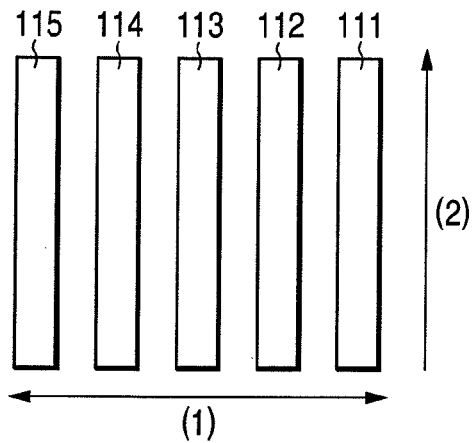
FIG. 9 is a view showing a first make-up example of a multiple recording head.
Figure 10:
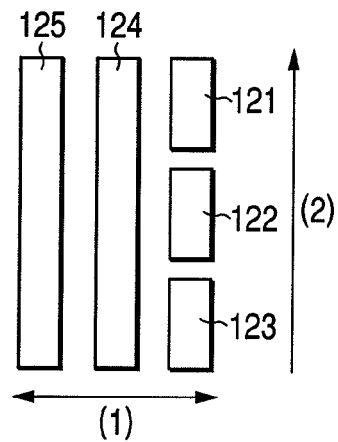
FIG. 10 is a view showing a second make-up example of the multiple recording head.
Figure 11:
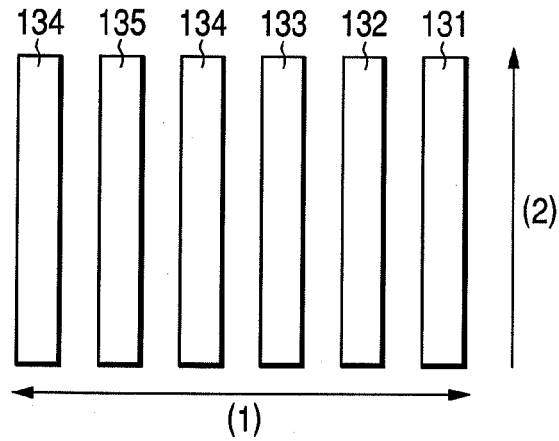
FIG. 11 is a view showing a third make-up example of the multiple recording head.

The ink-jet multiple recording head used preferably in the first embodiment may include, as specific make-up examples of how its recording heads are arranged, such three types as those shown in FIGS. 9 to 11. In FIGS. 9 to 11, reference numerals 111 to 114, 121 to 124, and 131 to 134 denote recording heads for ejecting therefrom a yellow ink (Y), a magenta ink (M), a cyan ink (C) and a black ink (Bk), respectively. Reference numerals 115, 125 and 135 denote recording heads for ejecting therefrom the liquid composition (S). The respective recording heads are arranged on a carriage like those shown in FIG. 7 (in a way which may differ depending on make-up examples). Each multiple recording head is disposed in the ink-jet recording apparatus as described previously, and ejects the inks with respective colors in accordance with recording signals. The liquid composition is, before or after the inks are ejected, made to adhere to the recording medium at its image forming areas to which at least the inks are to adhere or have adhered. Each multiple recording head is moved by the carriage in the direction of an arrow (1), and the recording medium is moved by the paper feed roller and so forth in the direction of an arrow (2).

First, in a first make-up example shown in FIG. 9, recording heads for S (115), Bk (114), C (113), M (112) and Y (111) are arranged in parallel on the carriage. A second make-up example shown in FIG. 10 is a recording head made up of recording heads for liquid composition and black ink arranged in parallel and, in parallel to these recording heads, recording heads for Y (121), M (122) and C (123) arranged in series with each other. Here, the respective recording heads need not necessarily have the same ejection volume per dot. The ejection volume per dot, Vd, of each recording head may be so adjusted as to be able to perform optimum recording, depending on composition and so forth of the liquid composition. Preferable make-up is, but not limited to, that the Vd's of S, Y, M and C are equal and the Vd of Bk is twice the former. Further, in a third make-up example shown in FIG. 11, recording heads for Bk (134), S (135), Bk (134), C (133), M (132) and Y (131) having the same ejection volume are arranged in parallel on the carriage. This can make the ejection quantity of the black ink set twice the ejection quantity of each of the other liquid composition and color inks. Incidentally, in the make-up example shown in FIG. 11, too, the recording heads for S, Bk, Y, M and C need not necessarily have the same ejection volume (Vd).

As described previously, in the first embodiment, the amounts of the liquid composition and ink (in particular, magenta ink) applied, per unit area on the recording medium in its image-formed regions, may be in a ratio of 1:1, which may also be ink:liquid composition=10:1 to 10:10. The ratio between the amounts of the liquid composition and ink applied, per unit area on the recording medium in its image-formed regions may specifically be controlled in the following way. For example, a method is available in which the number of pixels formed of the liquid composition to be made to adhere onto the recording medium is so controlled as to be within the range of from 10% to 100% of the number of pixels formed of the ink that is to adhere onto the recording medium; and a method in which, when the liquid composition and the ink are applied, the amount of the liquid composition to be ejected is so controlled as to be smaller than the amount of the ink to be ejected. Another method is also available in which the number of pixels formed of the liquid composition to be made to adhere onto the recording medium is so controlled as to be within the range of from 10% to 100% of the number of pixels formed of the ink that is to adhere onto the recording medium and also, when the liquid composition and the ink are applied onto the recording medium, the amount of the liquid composition to be ejected is so controlled as to be smaller than the amount of the ink to be ejected.

Second Embodiment

A second embodiment of the present invention is described below. In the second embodiment, an ink set is used which is made up of combination of at least one color ink and a black ink, and images are formed in such a way as described later. More specifically, the ink set is made up of combination of (1) at least one color ink containing a coloring material, a liquid medium, a polyvalent metal salt and a substance selected from cryptands and (2) a black ink which contains a coloring material and a liquid medium and is capable of reacting with the color ink upon contact with the color ink. Then, using this ink-jet recording ink set, inks are applied onto a recording medium in such a way that the black ink and the color ink which are contained in the ink set produce the state of contact between them on the recording medium, to perform recording.

In the ink set of the present invention, made up as described above, it is especially aimed to prevent color bleeding between the black ink and any of color inks, and no particular measure is taken to prevent color bleeding between the color inks with each other, as between yellow ink, magenta ink and cyan ink. However, the color ink may be so treated as to have a quick permeability also to plain paper having been sized. Such treatment is effective also in preventing color bleeding between color inks having different colors. As a specific method for the treatment that may make the color ink have a quick permeability also to plain paper having been sized, ink designing may be made, e.g., adding a surface active agent to the color ink.

The color ink making up the ink-jet recording ink set of the present invention as used in the second embodiment is described first. The color ink contains a coloring material, a liquid medium, a polyvalent metal salt and a substance selected from cryptands. As to the polyvalent metal salt and the cryptands, they are as having been detailed as the constituents of the liquid composition according to the above first embodiment.

The coloring material contained in the color ink making up the ink-jet recording ink set according to the second embodiment is described next. The coloring material may include direct dyes, acid dyes, basic dyes, disperse dyes and pigments. It may preferably be a dye capable of maintaining its solubility without reacting with the polyvalent metal salt even when mixed with the same. Such a coloring material may include, e.g., those enumerated below.

For example, it may include C.I. Acid Yellow 23; C.I. Acid Red 52, 289; C.I. Acid Blue 9; C.I. Reactive Red 180; C.I. Direct Blue 189, 199; C.I. Basic Yellow 1, 2, 11, 13, 14, 19, 21, 25, 32, 33, 36, 51; C.I. Basic Orange 2, 15, 21, 22; C.I. Basic Red 1, 2, 9, 12, 13, 37, 38, 39, 92; C.I. Basic Violet 1, 3, 7, 10, 14; C.I. Basic Blue 1, 3, 5, 7, 9, 19, 24, 25, 26, 28, 29, 45, 54, 65; C.I. Basic Green 1, 4; and C.I. Basic Brown 1, 12; and C.I. Basic Black 2, 8. However, examples are by no means limited to these. Any of these water-soluble dyes may be used alone, or may be used in combination of two or more. Any of these water-soluble dyes may preferably be used in a concentration ranging from 0.1% by mass to 20% by mass based on the total mass of the ink.

Besides the components described above, the color ink making up the ink-jet recording ink set according to the second embodiment may preferably be incorporated therein with at least one surface active agent. Incorporation of the surface active agent can endow the color ink with the desired permeability and viscosity. That is, as stated previously, in the second embodiment no particular measure is taken to prevent color bleeding between color inks with each other, as between yellow ink, magenta ink and cyan ink. However, the addition of the surface active agent to the color ink as above can provide a color ink having a quick permeability also to plain paper having been sized. As the result, this enables prevention of the color bleeding between color inks with each other, and any practically great lowering of print quality level may no longer come about.

As the surface active agent, any conventionally known surface active agent may be used, such as an anionic surface active agent, a cationic surface active agent and a nonionic surface active agent. In particular, it is preferable to use the nonionic surface active agent. There are no particular limitations on the amount of any of these surface active agents to be added to the color ink. In order to achieve the desired permeability and achieve a suitable ink viscosity, the surface active agent may preferably be added in an amount ranging from 0.01% by mass to 10% by mass, and more preferably from 0.1% by mass to 10% by mass, based on the total mass of the ink.

The black ink making up the ink-jet recording ink set according to the second embodiment is described next. The black ink used in the second embodiment is characterized by containing a coloring material and a liquid medium and being capable of reacting with the color ink upon contact with the color ink made up as described above. Stated specifically, it is preferable to use a coloring material capable of reacting with polyvalent metal ions coming from the polyvalent metal salt contained in the color ink. The "reacting" termed here has the same meaning as the case of the first embodiment described previously. The coloring material used in the black ink may include the black coloring materials usable in the first embodiment described previously. Any of these recording mediums may be used alone, or may be used in combination of two or more. Any of these coloring materials may preferably be added in an amount ranging from 0.1% by mass to 20% by mass based on the total mass of the ink.

In the second embodiment, it is more preferable to further add a nonionic surface active agent to the black ink. That is, doing in this way can more keep the color bleeding from occurring between the black ink and the color ink. Further, concurrently therewith, the addition of the nonionic surface active agent also brings the effect of more keeping what is called "white mist" from occurring as stated below, which means a lowering of black ink density at boundaries between the black ink and the color ink.

The color ink used in the ink-jet recording ink set according to the second embodiment may preferably be, as described previously, incorporated therein with the surface active agent for the purpose of improving properties required as the ink-jet recording ink. Hence, such a color ink often has a high permeability to recording mediums such as plain paper and a low surface tension. Then, when such a color ink having a low surface tension and a black ink having a high surface tension like that used in the second embodiment adjoin each other, regions where the coloring material of the black ink is in a small quantity may come about at the boundaries of black ink areas adjoining color ink areas to cause a phenomenon called "white mist". Accordingly, the nonionic surface active agent may be added to the black ink to lower its surface tension, and this can keep the phenomenon "white mist" from occurring.

In the second embodiment, there are no particular limitations on the content of the nonionic surface active agent to be incorporated in the black ink, as long as the color bleeding and the white mist can be kept from occurring. However, in order that the color bleeding can be better prevented from occurring between the black ink and the color ink, the white mist can effectively from occurring and also ink ejection performance and print quality level are well maintained, the nonionic surface active agent may preferably be used in a content ranging from 0.1% by mass to 0.5% by mass, and particularly preferably from 0.2% by mass to 0.4% by mass, based on the total mass of the ink.

The nonionic surface active agent used here may include those as enumerated below. It may include, e.g., nonionic surface active agents such as higher alcohol ethylene oxide addition products, alkylphenol ethylene oxide addition products, aliphatic ethylene oxide addition products, polyhydric alcohol aliphatic ester ethylene oxide addition products, aliphatic amide ethylene oxide addition products, higher alkylamine ethylene oxide addition products, polypropylene glycol ethylene oxide addition products, fatty esters of polyhydric alcohols, and aliphatic acid amides of alkanolamines. Any of these may all preferably be used. More preferably, those enumerated below may be used, which are nonionic surface active agents such as higher alcohol ethylene oxide addition products, alkylphenol ethylene oxide addition products, ethylene oxide-propylene oxide copolymers, and acetylene glycol ethylene oxide addition products. Further, particularly preferred are the above ethylene oxide addition products the addition molar number of which is within the range of from 4 to 20.

As the liquid medium used in the black ink and color ink making up the above ink-jet recording ink set, the water-soluble organic solvent may be used which has been detailed as the liquid medium used in the liquid composition of the present invention described previously and in the ink used in combination with the former. The other additives, the amounts in their addition, their physical properties and so forth may be the same as those for the liquid composition and so forth of the present invention described previously.

An ink-jet recording process according to the second embodiment and an ink-jet recording apparatus that can carry out the process are described next. The ink-jet recording process according to the second embodiment is characterized by having the following two steps and being carried out in such a way that the state of contact of the black ink with the color ink is produced on the recording medium. This ink-jet recording process has: (i) the step of providing the black ink making up the ink set of the second embodiment, with energy for ejecting the ink, to eject the black ink toward a recording medium so as to be applied onto the recording medium; and (ii) the step of providing the color ink making up the ink set of the second embodiment, with energy for ejecting the ink, to eject the color ink toward the recording medium so as to be applied onto the recording medium; and carries out the above steps (i) and (ii) in such a way that the state of contact of the black ink with the color ink is produced on the recording medium.

As an ink-jet recording system preferable in this case, a system is available in which the ink is provided with heat energy to eject the ink.

There are no particular limitations on the recording medium used in the ink-jet recording process according to the second embodiment. In the present invention, however, the effect of lessening the color bleeding is remarkably brought out especially where images are formed on what is called plain paper such as copying paper and bond paper, having conventionally been used. Accordingly, such plain paper is preferred. Of course, the ink-jet recording ink set according to the second embodiment may preferably be used also for, e.g., coated paper and OHP transparent film which have specially been made for ink-jet recording. Further, it may preferably be used also for commonly available woodfree paper and glossy paper.

The ink-jet recording process according to the second embodiment is also characterized by carrying out the above steps (i) and (ii) in such a way that the state of contact of the black ink with the color ink is produced on the recording medium. As a specific embodiment of applying the black ink and the color ink onto the recording medium in the way described above, a method is available in which the black ink and the color ink are so applied as to adjoin each other at boundaries.

Figure 16:
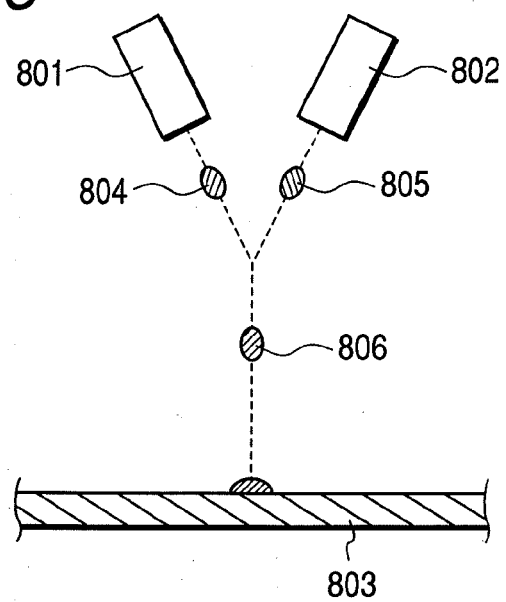
FIG. 16 is a schematic view showing the ink-jet recording process according to the first embodiment of the present invention.

As another embodiment, a method is available in which the black ink (1) and the color ink (2) are so applied as to come superimposed on the recording medium and also the color ink is applied onto the recording medium before the black ink is applied (this method is hereinafter "underinking method"). Carrying out such an underinking method can lessen the color bleeding between the black ink and the color ink in a more improved state and further can lessen the "white mist" stated above. In the underinking method, there are no particular limitations on the time for which the color ink is first made to adhere to the recording medium and thereafter the black ink is made to adhere thereto. In order to make the above second embodiment more effective, such time may be set within few seconds, and particularly preferably within one (1) second. Other embodiments may also be given in which the black ink is applied first and thereafter the color ink is applied first (overinking) and, as shown in FIG. 16, the color ink and the black ink are mixed together immediately after they have separately been ejected.

In the underinking method, the amounts of the black ink (1) and color ink (2) applied, per unit area on the recording medium in its image-formed regions, may be in a ratio of 1:1, which may also be black ink(1):color ink(2)=10:1 to 10:10. Being in this way can lessen the white mist in the images to be obtained and can achieve uniformity especially in solid images. Here, the ratio between the amounts of the black ink and color ink applied, per unit area on the recording medium in its image-formed regions may specifically be controlled in the following way. For example, methods are available in which, when the black ink and the color ink are applied by the ink-jet recording system, the number of pixels formed of the color ink to be made to adhere onto the recording medium is so controlled as to be within the range of from 10% to 100% of the number of pixels formed of the black ink that is to adhere onto the recording medium; the amount of the color ink to be ejected is so controlled as to be smaller than the amount of the black ink to be ejected; and the number of pixels formed of the color ink to be made to adhere onto the recording medium is so controlled as to be within the range of from 10% t0 100% of the number of pixels formed of the ink that is to adhere onto the recording medium and also the amount of the color ink to be ejected is so set as to be smaller than the amount of the black ink to be ejected.

In the second embodiment, an ink-jet recording process is used as the method by which the black ink and the color ink which make up the ink-jet recording ink set according to second embodiment are made to adhere onto the recording medium. As the ink-jet jet recording process used here, any of conventionally known various ink-jet recording systems may be used, as exemplified by an ink-jet recording process that utilizes mechanical energy produced by the deformation of a piezoelectric element. The use of an ink-jet recording process that utilizes heat energy is more preferred because the remarkable effect of the present invention is especially obtainable.

Figure 12:
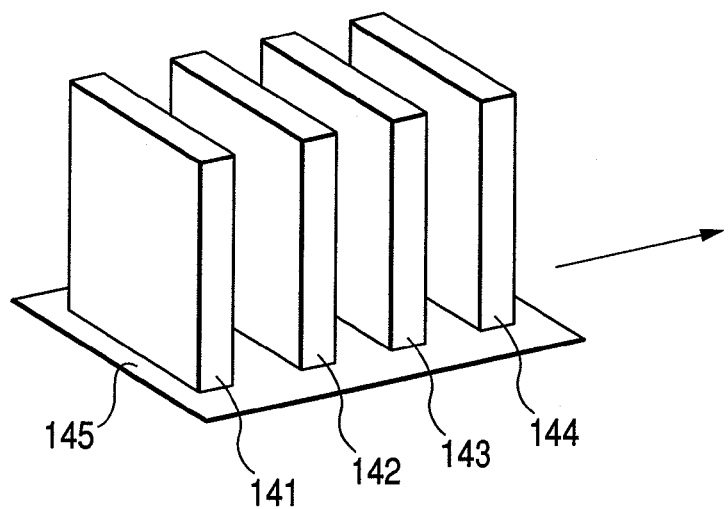
FIG. 12 is a perspective view showing a multiple recording head where a plurality of recording heads are arranged.

As described previously, the color ink containing the polyvalent metal salt is used in order to make improvement in keeping color-mix blotting (color bleeding) from occurring between the black ink and the color ink. Then, the ejection disability that may come about when images are formed by using the ink-jet recording process that utilizes heat energy in ejecting the color ink can effectively be prevented by the ink-jet recording process making use of the ink set according to the second embodiment. Further, where a color ink containing the polyvalent metal salt at an aim to keep the color bleeding from occurring is repeatedly ejected from the recording head, the conventional process may cause a problem as stated below. That is, in the case of the foregoing, the outermost surface protective layer may melt which is formed on the heater (a heat generating element substrate member) that provides the color ink with heat energy and is formed of a metal and/or a metal oxide. Then, this causes wire break of the heater to bring about a situation that the ejection comes disable. For example, this problem may come about when the outermost surface protective layer is formed of, e.g., tantalum or an oxide of tantalum. In such a case, it has come about that this may affect the quality of images to be formed. However, such a problem is effectively prevented like what has been stated in the first embodiment. Incidentally, as to the ink-jet recording apparatus that utilizes heat energy, it is as having been described in the first embodiment.

Where color images are formed by the ink-jet recording process according to the second embodiment, an ink-jet recording apparatus is used in which, e.g., the recording head shown in FIG. 3 is set in fours, which are arranged on a carriage to make up a multiple recording head. FIG. 12 shows an example of such a multiple recording head. Reference numerals 141, 142, 143 and 144 denote recording heads for ejecting therefrom a yellow ink (Y), a magenta ink (M), a cyan ink (C) and a black ink (Bk), respectively. This multiple recording head is disposed in the above ink-jet recording apparatus, and the inks with respective colors are ejected in accordance with recording signals for ejecting the inks with respective colors while, e.g., a carriage 145 is moved in the direction of an arrow.

Figure 13:
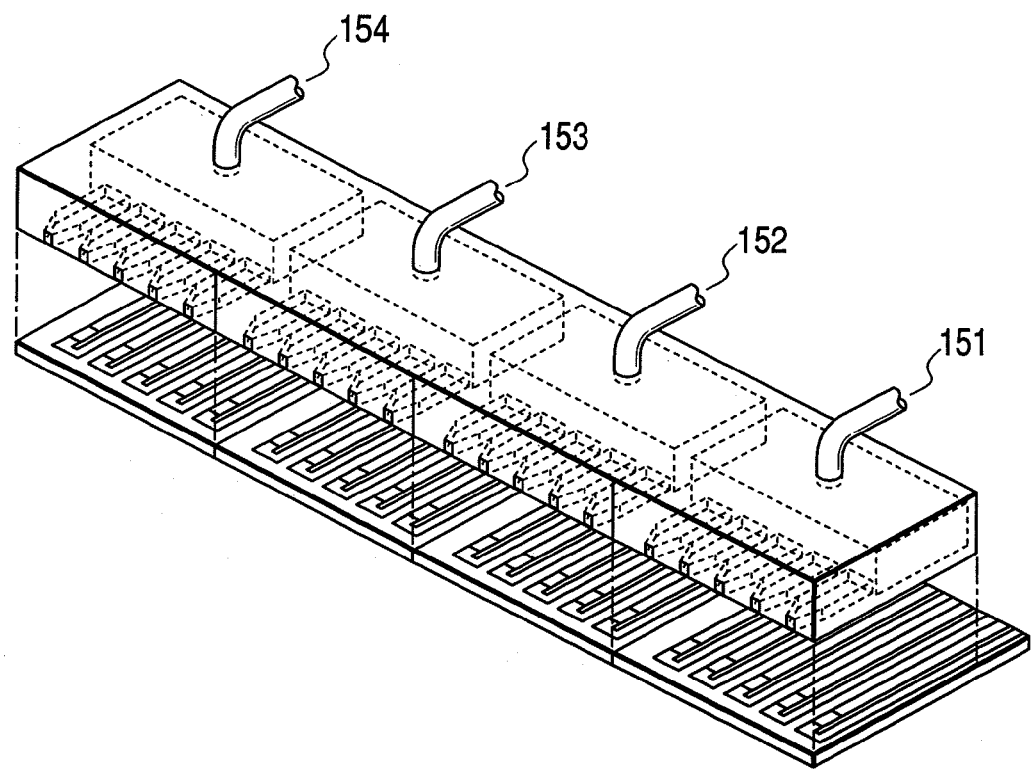
FIG. 13 is a perspective view showing another recording head used in the present invention.

An example where four recording heads are used in combination to make up a multiple recording head is shown in FIG. 12. Without limitation thereto, a case is also preferable in which, as shown in FIG. 13, in a single recording head, a plurality of fluid channels for a black ink 154, a cyan ink 153, a magenta ink 152 and a yellow ink 151 are dividedly provided to carry out the color image formation.

Figure 14:
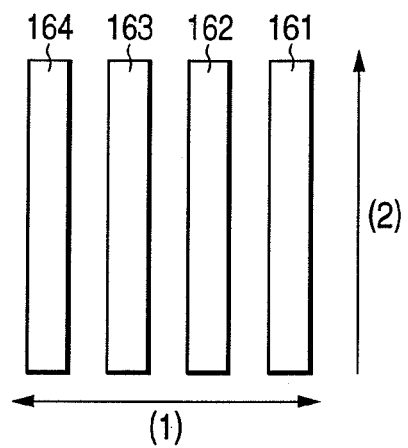
FIG. 14 is a view showing a fourth make-up example of the multiple recording head.
Figure 15:
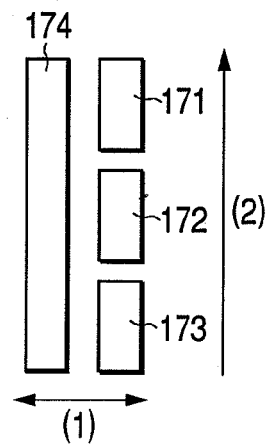
FIG. 15 is a view showing a fifth make-up example of the multiple recording head.

The ink-jet multiple recording head used preferably in the second embodiment may include, as specific make-up examples of how its recording heads are arranged, such two types as those shown in FIGS. 14 and 15. In FIGS. 14 and 15, reference numerals 161 to 164, and 171 to 174 denote recording heads for ejecting therefrom a yellow ink, a magenta ink, a cyan ink and a black ink, respectively. The respective recording heads are arranged on a carriage like those shown in FIG. 12 (in a way which may differ depending on make-up examples). Each multiple recording head is disposed in the ink-jet recording apparatus as described previously, and ejects the respective kinds of inks in accordance with recording signals. Each multiple recording head is moved by the carriage in the direction of an arrow (1), and the recording medium is moved by the paper feed roller and so forth in the direction of an arrow (2).

First, in a first make-up example shown in FIG. 14, recording heads for Bk (164), C (163), M (162) and Y (161) are arranged in parallel on the carriage. In a second make-up example shown in FIG. 15, it has a recording head for black ink and, in parallel to this recording head, recording heads for C (173), M (172) and Y (171) arranged in series with each other. This head may also be used in what is called a line printer in which, in what is shown in FIG. 14, the carriage is set stationary and the recording medium is moved by the paper feed roller or the like in the direction of an arrow (2).

EXAMPLES

The present invention is described below in greater detail by giving Examples and Comparative Examples. The present invention is by no means limited by the following Examples. In the following, "part(s)" and "(%)" are by mass unless particularly noted.

Examples and Comparative Examples of First Embodiment

Examples 1 to 13 and Comparative Examples 1 to 13

As liquid compositions and inks used in Examples and Comparative Examples, those composed of components as shown below were prepared by the following preparation method. As to the liquid compositions, and inks making use of dyes as coloring materials, they were each prepared by dissolving the following components, further followed by pressure filtration using a micro-filter of 0.2 μm in pore size (available from Fuji Photo Film Co., Ltd.). In the case of inks making use of pigments as coloring materials, pigment dispersions were prepared first by respective methods described later, and the pigment dispersions were used to prepare inks. That is, the pigment dispersions obtained were each mixed with the following components, followed by pressure filtration using a micro-filter of 3 μm in pore size (available from Fuji Photo Film Co., Ltd.) to prepare respectively the inks making use of pigments as coloring materials.

Liquid Compositions 1 and 2 composed of the following components were respectively prepared. Liquid Compositions 3 and 4 do not contain as shown below any substance selected from cryptands, and hence correspond to Comparative Examples.

| Liquid Composition 1 | |
| --- | --- |
| Diethylene glycol | 20 parts |
| ACETYLENOL EH | 1 part |
| (available from Kawaken Fine Chemicals Co., Ltd.) | |
| Magnesium nitrate hexahydrate | 2.6 parts |
| Cryptand[222] | 3 parts |
| Nitric acid | 0.7 part |
| Water | 72.7 parts |

| Liquid Composition 2 | |
| --- | --- |
| Diethylene glycol | 20 parts |
| ACETYLENOL EH | 1 part |
| (available from Kawaken Fine Chemicals Co., Ltd.) | |
| Calcium nitrate tetrahydrate | 2.3 parts |
| Cryptand[222] | 3 parts |
| Nitric acid | 0.7 part |
| Water | 73.0 parts |

| Liquid Composition 3 | |
| --- | --- |
| Diethylene glycol | 20 parts |
| ACETYLENOL EH | 1 part |
| (available from Kawaken Fine Chemicals Co., Ltd.) | |
| Magnesium nitrate hexahydrate | 2.6 parts |
| Water | 76.4 parts |

| Liquid Composition 4 | |
| --- | --- |
| Diethylene glycol | 20 parts |
| ACETYLENOL EH | 1 part |
| (available from Kawaken Fine Chemicals Co., Ltd.) | |
| Calcium nitrate tetrahydrate | 2.3 parts |
| Water | 76.7 parts |

Black Ink 1
Preparation of Pigment Dispersion 1

300 g of commercially available acidic carbon black "MA77" (pH: 3; available from Mitsubishi Chemical Corporation) was thoroughly mixed in 1,000 ml of water. Thereafter, to the mixture obtained, 450 g of sodium hypochloride (effective chlorine concentration: 12%) was dropwise added, and these were stirred for 10 hours at a constant temperature of 100 to 105° C. The slurry thus obtained was filtered with Toyo Filter Paper No. 2 (available from Advantis Co.), and the pigment particles obtained were thoroughly washed with water. The resultant pigment wet cake was re-dispersed in 3,000 ml of water, followed by desalting with a reverse osmosis membrane up to a conductivity of 0.2 μs to obtain a pigment dispersion. This pigment dispersion (pH: 8 to 10) was further concentrated to have a pigment concentration of 10%. In this way, Pigment Dispersion 1 was obtained into carbon black particle surface portions of which —COONa groups were introduced to have carbon black of such a self-dispersion type.

Preparation of Ink

The following components including Pigment Dispersion 1 obtained as above were mixed, further followed by pressure filtration using a micro-filter of 3 μm in pore size (available from Fuji Photo Film Co., Ltd.) to prepare Black Ink 1.

| Pigment Dispersion 1 as above | 40 parts |
| --- | --- |
| Glycerol | 8 parts |
| Trimethylolpropane | 5 parts |
| Isopropyl alcohol | 4 parts |
| Water | 43 parts |

Black Ink 2
Preparation of Pigment Dispersion 2

| Styrene-acrylic acid-butyl acrylate copolymer | 5 parts |
| --- | --- |
| (acid value: 116; average molecular weight: 3,700) | |
| Triethanolamine | 0.5 part |
| Diethylene glycol | 5 parts |
| Water | 69.5 parts |

The above components were mixed, and the mixture obtained was heated to 70° C. with a water bath to make the resin component dissolve completely. To the solution obtained, 15 parts of carbon black "MA-100" ((pH: 3.5; available from Mitsubishi Chemical Corporation) and 5 parts of 2-propanol were added, and these were premixed for 30 minutes, followed by dispersion treatment under the following conditions. Dispersion machine: Sand grinder (manufactured by Igarashi Kikai).
Grinding medium: Zirconium beads of 1 mm in diameter.
Packing of grinding medium: 50% by volume.
Grinding time: 3 hours.

Further, coarse particles were removed by centrifugal separation (at 12,000 rpm for 20 minutes) to prepare Pigment Dispersion 2, containing carbon black.

Preparation of Ink

The following components including Pigment Dispersion 2 obtained as above were mixed, further followed by pressure filtration using a micro-filter of 3 μm in pore size (available from Fuji Photo Film Co., Ltd.) to prepare Black Ink 2.

| | |
|---|---|
| Pigment Dispersion 2 as above | 20 parts |
| Trimethylolpropane | 5 parts |
| Diethylene glycol | 10 parts |
| 2-Pyrrolidone | 5 parts |
| ACETYLENOL EH | 0.2 part |
| (available from Kawaken Fine Chemicals Co., Ltd.) | |
| Water | 59.8 parts |

Black Ink 3

The following components including as a coloring material Exemplary Compound 1 as above were mixed, further followed by pressure filtration using a micro-filter of 0.2 μm in pore size (available from Fuji Photo Film Co., Ltd.) to prepare Black Ink 3.

| | |
|---|---|
| Exemplary Compound 1 as above | 2 parts |
| (M in the formula is $NH_4^+$) | |
| Diethylene glycol | 10 parts |
| 2-Pyrrolidone | 5 parts |
| 2-Propanol | 5 parts |
| Sodium hydroxide | 0.1 part |
| Water | 77.9 parts |

Yellow Ink 1
Preparation of Pigment Dispersion 3

| | |
|---|---|
| Styrene-acrylic acid copolymer | 5.5 parts |
| (acid value: 200; average molecular weight: 7,000) | |
| Monoethanolamine | 1.0 part |
| Ion-exchanged water | 67.5 parts |
| Diethylene glycol | 5.0 parts |

The above components were mixed, and the mixture obtained was heated to 70° C. with a water bath to make the resin component dissolve completely. To the solution obtained, 20 parts of C.I. Pigment Yellow 93 and 1.0 part of isopropyl alcohol were added, and these were premixed for 30 minutes, followed by dispersion treatment under the following conditions.
Dispersion machine: Sand grinder.
Grinding medium: Glass beads of 1 mm in diameter.
Packing of grinding medium: 50% by volume.
Grinding time: 3 hours.

Further, coarse particles were removed by centrifugal separation (at 12,000 rpm for 20 minutes) to prepare Pigment Dispersion 3.

Preparation of Ink

The following components including Pigment Dispersion 3 obtained as above were mixed, further followed by pressure filtration using a micro-filter of 3 μm in pore size (available from Fuji Photo Film Co., Ltd.) to prepare Yellow Ink 1.

| | |
|---|---|
| Pigment Dispersion 3 as above | 20 parts |
| Glycerol | 15 parts |
| Diethylene glycol | 10 parts |
| ACETYLENOL EH | 0.3 part |
| (available from Kawaken Fine Chemicals Co., Ltd.) | |
| Water | 54.7 parts |

Yellow Ink 2

The following components including as a coloring material Exemplary Compound 2 as above were used, and these were dissolved, followed by pressure filtration using a micro-filter of 0.2 μm in pore size (available from Fuji Photo Film Co., Ltd.) to prepare Yellow Ink 2.

| | |
|---|---|
| Exemplary Compound 2 as above | 3 parts |
| (M in the formula is $NH_4^+$) | |
| Glycerol | 7 parts |
| Diethylene glycol | 5 parts |
| Urea | 5 parts |
| Ethanol | 2 part |
| Water | 78 parts |

Magenta Ink 1
Preparation of Pigment Dispersion 4

| | |
|---|---|
| Styrene-acrylic acid copolymer | 5.5 parts |
| (acid value: 200; average molecular weight: 7,000) | |
| Monoethanolamine | 1.0 part |
| Ion-exchanged water | 67.5 parts |
| Diethylene glycol | 5.0 parts |

The above components were mixed, and the mixture obtained was heated to 70° C. with a water bath to make the resin component dissolve completely. To the solution obtained, 20 parts of C.I. Pigment Red 122 and 1.0 of isopropyl alcohol were added, and these were premixed for 30 minutes, followed by dispersion treatment under the following conditions.
Dispersion machine: Sand grinder.
Grinding medium: Glass beads of 1 mm in diameter.
Packing of grinding medium: 50% by volume.
Grinding time: 3 hours.

Further, coarse particles were removed by centrifugal separation (at 12,000 rpm for 20 minutes) to prepare Pigment Dispersion 4.

Preparation of Ink

The following components including Pigment Dispersion 4 obtained as above were mixed, further followed by pressure filtration using a micro-filter of 3 μm in pore size (available from Fuji Photo Film Co., Ltd.) to prepare Magenta Ink 1.

| | |
|---|---|
| Pigment Dispersion 4 as above | 20 parts |
| Glycerol | 15 parts |
| Diethylene glycol | 10 parts |
| ACETYLENOL EH | 0.3 part |
| (available from Kawaken Fine Chemicals Co., Ltd.) | |
| Water | 54.7 parts |

Magenta Ink 2

The following components including as a coloring material Exemplary Compound 3 as above were used, and these were dissolved, followed by pressure filtration using a micro-filter of 0.2 µm in pore size (available from Fuji Photo Film Co., Ltd.) to prepare Magenta Ink 2.

| | |
|---|---|
| Exemplary Compound 3 as above (M in the formula is $NH_4^+$) | 3 parts |
| Glycerol | 7 parts |
| Diethylene glycol | 5 parts |
| Urea | 5 parts |
| Ethanol | 2 parts |
| Water | 78 parts |

Cyan Ink 1
Preparation of Pigment Dispersion 5

| | |
|---|---|
| Styrene-acrylic acid copolymer (acid value: 200; average molecular weight: 7,000) | 5.5 parts |
| Monoethanolamine | 1.0 part |
| Ion-exchanged water | 67.5 parts |
| Diethylene glycol | 5.0 parts |

The above components were mixed, and the mixture obtained was heated to 70° C. with a water bath to make the resin component dissolve completely. To the solution obtained, 20 parts of C.I. Pigment Blue 15:3 and 1.0 of isopropyl alcohol were added, and these were premixed for 30 minutes, followed by dispersion treatment under the following conditions.
Dispersion machine: Sand grinder.
Grinding medium: Glass beads of 1 mm in diameter.
Packing of grinding medium: 50% by volume.
Grinding time: 3 hours.

Further, coarse particles were removed by centrifugal separation (at 12,000 rpm for 20 minutes) to prepare Pigment Dispersion 5.

Preparation of Ink

The following components including Pigment Dispersion 5 obtained as above were mixed, further followed by pressure filtration using a micro-filter of 3 µm in pore size (available from Fuji Photo Film Co., Ltd.) to prepare Cyan Ink 1.

| | |
|---|---|
| Pigment Dispersion 5 as above | 20 parts |
| Glycerol | 15 parts |
| Diethylene glycol | 10 parts |
| ACETYLENOL EH (available from Kawaken Fine Chemicals Co., Ltd.) | 0.3 part |
| Water | 54.7 parts |

Cyan Ink 2

The following components including as a coloring material Exemplary Compound 4 as above were used, and these were dissolved, followed by pressure filtration using a micro-filter of 0.2 µm in pore size (available from Fuji Photo Film Co., Ltd.) to prepare Cyan Ink 2.

| | |
|---|---|
| Exemplary Compound 4 as above (M in the formula is $NH_4^+$) | 3 parts |
| Glycerol | 7 parts |
| Diethylene glycol | 5 parts |
| Urea | 5 parts |
| Ethanol | 2 parts |
| Water | 78 parts |

Evaluation and Evaluation Criteria
Evaluation Test
Evaluation tests are reported below.
Evaluation 1

First, Liquid Compositions 1 and 2 made up according to the present invention and Liquid Compositions 3 and 4 of Comparative Examples, obtained as described above, were each set in the following ink-jet recording apparatus, and the liquid compositions were each ejected under the following conditions to make evaluation for each liquid composition. As the ink-jet recording apparatus, an apparatus was used which had an on-demand type multiple recording head (BC-02, manufactured by CANON INC.) ejecting the liquid composition by providing it with heat energy in accordance with recording signals. This multiple recording head was one having a head the outermost surface protective layer of a heater of which was formed of tantalum and tantalum oxide. Ejection durability (ejection performance) was evaluated using the above ink-jet recording apparatus, by ejecting each liquid composition under the following conditions. Conditions for ejecting the liquid composition in the ink-jet recording apparatus were as follows: The liquid composition was ejected at pulse widths of 1.1 µs (ON)+3.0 µs (OFF)+3.2 µs (ON) and at a drive frequency of 6,250 Hz under application of $V_{op}$ (drive voltage) corresponding to a γ value of 1.69 found by actually measuring $V_{th}$ (the critical energy that barely enables ejection). Then, ejection durability in the ink-jet recording apparatus when the ink-jet recording was performed under such conditions was evaluated in the following way and according to the following criteria. Results obtained are shown in Table 1.

1. Ejection Durability

Continuous ejection was performed using the above ink-jet recording apparatus and under the above driving conditions. Droplets ejected from the recording head at intervals of $1 \times 10^6$ shots were collected in a container, and this container was weighed with an electronic balance. Then, an average ejected droplet quantity for every $1 \times 10^6$ shots was calculated from a gain in weight of the container during that ejection. Here, the continuous ejection was performed up to $1 \times 10^8$ shots. Then, an average ejected droplet quantity at the initial stage of from the first ejection up to the $1 \times 10^6$ shots was compared with an average ejected droplet quantity at the finish of the final ejection of the $1 \times 10^6$ shots in the durability test, to make evaluation according to the following criteria. Results obtained are shown in Table 1.

A: The average ejected droplet quantity during $9.9 \times 10^7$ to $1 \times 10^8$ shots at the finish of the test is 90% or more as compared with the average ejected droplet quantity during 0 to $1 \times 10^6$ shots at the initial stage of the test.

B: The average ejected droplet quantity during $9.9 \times 10^7$ to $1 \times 10^8$ shots at the finish of the test is from less than 90% to 70% or more as compared with the average ejected droplet quantity during 0 to $1 \times 10^6$ shots at the initial stage of the test.

C: The average ejected droplet quantity during $9.9 \times 10^7$ to $1 \times 10^8$ shots at the finish of the test is less than 70% as compared with the average ejected droplet quantity during 0 to $1 \times 10^6$ shots at the initial stage of the test.

D: The recording head has run into ejection disability on the way of the test.

TABLE 1

Evaluation Results of Ejection Durability

| | Liquid Composition No. | 1. Ejection durability |
|---|---|---|
| Example 1 | 1 | A |
| Example 2 | 2 | A |
| Comparative Example 1 | 3 | D |
| Comparative Example 2 | 4 | D |

Evaluation 2

The inks and Liquid Compositions 1 to 4, obtained as above, were used in the combination shown in Tables 2-1 and 2-2 to perform recording on recording mediums. As an ink-jet recording apparatus used, an ink-jet recording apparatus made up like that shown in FIG. 4 was used, and images were formed using two recording heads of the multiple recording head consisting of five recording heads shown in FIG. 7. Here, the recording was so set up that the liquid composition was pre-shot to make it adhere first onto the recording medium and thereafter the ink was made to adhere thereto. The position where the liquid composition was applied onto the recording medium was so adjusted as to fall accurately on the position where the ink was to be applied onto the recording medium. The recording heads of the multiple recording head used here each had a recording density of 360 dpi and were set at a drive frequency of 5 kHz. As to ejection volume per dot, it was 80 pl/dot in respect of the ink and 40 pl/dot in respect of the liquid composition. As recording mediums, used were PB PAPER (available from CANON INC.: paper common to use in copying machines and use in ink-jet recording) and XEROX 4024 PAPER (available from Xerox Corporation).

2. Water Resistance of Images

The inks and the liquid compositions were used in the combination shown in Tables 2-1 and 2-2, to perform printing in the same manner as above. Then the print obtained was left for 1 hour and thereafter print density was measured with MACBETH RD915 (trade name: a densitometer available from Gretag Macbeth Ag). Thereafter, this print was immersed for 3 minutes in city water filled in a container, which was thereafter taken out thereof and then left to become dry, and thereafter the print density was again measured. Using measured values obtained, the retention (percentage of retention) of the print density before and after the above operation was made was found and was used to evaluate water resistance. As the water resistance of print, it is preferable in practical use that the retention of the print density thus found is 95% or more. Evaluation results thus obtained on the water resistance are shown in Tables 2-1 and 2-2 in respect of Examples and Comparative Examples, respectively.

A: The retention of print density is 95% or more.
B: The retention of print density is from 85% or more to less than 95%.
C: The retention of print density is less than 85%.

3. Print Quality of Images (Blotting):

Alphanumeric signs (12-point) were printed in the same way as the foregoing. The print obtained was left for 1 hour, and thereafter visually evaluated by the sharpness of letters and the extent to which any whiskery blotting occurred which might occur at edges of letters. Evaluation results thus obtained on the print quality are also shown in Tables 2-1 and 2-2 in respect of Examples and Comparative Examples, respectively.

A: Letters are sharp and also free of any whiskery blotting.
B: Letters are lacking in sharpness, and also have blotting occurring a little.
C: Letters are lacking in sharpness, and also have blotting occurring much.

TABLE 2-1

Evaluation Results of Print Water-resistance and Print Quality (Blotting)

| Combination used in image formation | | | 2. Water resistance | | 3. Print quality | |
|---|---|---|---|---|---|---|
| Liquid composition | Colored ink | | PB PAPER | 4024 PAPER | PB PAPER | 4024 PAPER |
| Example 3 | 1 | Black 1 (self-dispersion type pigment) | A | A | A | A |
| Example 4 | 1 | Black 2 (pigment) | A | A | A | A |
| Example 5 | 1 | Black 3 (dye) | A | A | A | A |
| Example 6 | 1 | Yellow 1 (pigment) | A | A | A | A |
| Example 7 | 1 | Yellow 2 (dye) | A | A | A | A |
| Example 8 | 1 | Magenta 1 (pigment) | A | A | A | A |
| Example 9 | 1 | Magenta 2 (dye) | A | A | A | A |
| Example 10 | 1 | Cyan 1 (pigment) | A | A | A | A |
| Example 11 | 1 | Cyan 2 (dye) | A | A | A | A |
| Example 3 | 2 | Black 1 (self-dispersion type pigment) | A | A | A | A |
| Example 4 | 2 | Black 2 (pigment) | A | A | A | A |
| Example 5 | 2 | Black 3 (dye) | A | A | A | A |
| Example 6 | 2 | Yellow 1 (pigment) | A | A | A | A |
| Example 7 | 2 | Yellow 2 (dye) | A | A | A | A |
| Example 8 | 2 | Magenta 1 (pigment) | A | A | A | A |
| Example 9 | 2 | Magenta 2 (dye) | A | A | A | A |
| Example 10 | 2 | Cyan 1 (pigment) | A | A | A | A |
| Example 11 | 2 | Cyan 2 (dye) | A | A | A | A |

"PB PAPER" and "4024 PAPER" in the table refer to PB PAPER available from CANON INC. and XEROX 4024 PAPER, available from Xerox Corporation, respectively.

TABLE 2-2

Evaluation Results of Print Water-resistance and Print Quality (Blotting)

| Combination used in image formation | | | 2. Water resistance | | 3. Print quality | |
|---|---|---|---|---|---|---|
| Liquid composition | Colored ink | | PB PAPER | 4024 PAPER | PB PAPER | 4024 PAPER |
| Comparative Example 3 | 3 | Black 1 (self-dispersion type pigment) | A | A | B | B |

TABLE 2-2-continued

Evaluation Results of Print Water-resistance and Print Quality (Blotting)

| | Combination used in image formation | | 2. Water resistance | | 3. Print quality | |
|---|---|---|---|---|---|---|
| | Liquid compo-sition | Colored ink | PB PAPER | 4024 PAPER | PB PAPER | 4024 PAPER |
| Comparative Example 4 | 3 | Black 2 (pigment) | A | A | B | B |
| Comparative Example 5 | 3 | Black 3 (dye) | C | C | C | C |
| Comparative Example 6 | 3 | Yellow 1 (pigment) | A | A | B | B |
| Comparative Example 7 | 3 | Yellow 2 (dye) | B | B | C | C |
| Comparative Example 8 | 3 | Magenta 1 (pigment) | A | A | B | B |
| Comparative Example 9 | 3 | Magenta 2 (dye) | C | C | C | C |
| Comparative Example 10 | 3 | Cyan 1 (pigment) | A | A | B | B |
| Comparative Example 11 | 3 | Cyan 2 (dye) | C | C | C | C |
| Comparative Example 3 | 4 | Black 1 (self-dispersion type pigment) | A | A | B | B |
| Comparative Example 4 | 4 | Black 2 (pigment) | A | A | B | B |
| Comparative Example 5 | 4 | Black 3 (dye) | C | C | C | C |
| Comparative Example 6 | 4 | Yellow 1 (pigment) | A | A | B | B |
| Comparative Example 7 | 4 | Yellow 2 (dye) | B | B | C | C |
| Comparative Example 8 | 4 | Magenta 1 (pigment) | A | A | B | B |
| Comparative Example 9 | 4 | Magenta 2 (dye) | C | C | C | C |
| Comparative Example 10 | 4 | Cyan 1 (pigment) | A | A | B | B |
| Comparative Example 11 | 4 | Cyan 2 (dye) | C | C | C | C |

"PB PAPER" and "4024 PAPER" in the table refer to PBPAPER, available from CANON INC., and XEROX 4024 PAPER, available from Xerox Corporation, respectively.

4. Color Bleeding (Color-Mix Blotting between Different Colors)

On the same two kinds of plain paper as those used in the previous tests, images were formed using ink sets each consisting of a liquid composition and inks in the combination shown in Table 3 and using the same apparatus as that used in the previous tests, to make evaluation on whether or not the color bleeding occurred. First, a solid area was formed by printing with the liquid composition and, immediately thereafter, a solid area was formed by printing with a black ink over some extent of the solid area of the liquid composition. Further, immediately thereafter, solid areas were formed by printing with yellow, magenta or cyan color ink over the remaining extent of the solid area of the liquid composition in such a way that they adjoin the solid area of the black ink, to make evaluation on the color bleeding that might occur between the respective inks. Evaluation was made according to the following criteria. Results obtained are shown in Table 3.

A: No color bleeding is seen at every boundary.
B: Color bleeding is slightly seen, but not conspicuous so much.
C: Color bleeding is seriously seen at almost every boundary.

TABLE 3

Evaluation Results on Color Bleeding

| | Ink set | | | | | 4. Color bleeding | |
|---|---|---|---|---|---|---|---|
| | Liquid composition | Colored-ink set | | | | PB PAPER | 4024 PAPER |
| Example 12 | 1 | Black 1 (self-dispersion type pigment) | Yellow 1 (pigment) | Magenta 1 (pigment) | Cyan 1 (pigment) | A | A |
| | 2 | | | | | A | A |
| Example 13 | 1 | Black 3 (dye) | Yellow 2 (dye) | Magenta 2 (dye) | Cyan 2 (dye) | A | A |
| | 2 | | | | | A | A |
| Comp. Example 12 | 3 | Black 1 (self-dispersion type pigment) | Yellow 1 (pigment) | Magenta 1 (pigment) | Cyan 1 (pigment) | C | C |
| | 4 | | | | | C | C |
| Comp. Example 13 | 3 | Black 3 (dye) | Yellow 2 (dye) | Magenta 2 (dye) | Cyan 2 (dye) | C | C |
| | 4 | | | | | C | C |

Examples and Comparative Examples of Second Embodiment

Example 14 & Comparative Example 14

Black inks and color ink sets consisting of yellow, magenta and cyan three color inks which were each composed as described below were combined to make up ink sets of Example 14 and Comparative Example 14. In Example 14, two kinds of color ink sets 1 and 2 were used in which different polyvalent metal salts were incorporated. The inks making up the respective ink sets were prepared in the following way by using the components shown below. First, as the black ink making up each ink set, Pigment Dispersion 1 prepared in Examples of the first embodiment was used, and was mixed with the components shown below, followed by pressure filtration using a micro-filter of 3 μm in pore size (available from Fuji Photo Film Co., Ltd.). As to the color inks making up each color ink set (inks making use of dyes as coloring materials), the components shown below were mixed, followed by pressure filtration using a micro-filter of 0.2 μm in pore size (available from Fuji Photo Film Co., Ltd.). Chief composition of the ink sets each, of Example 14 and Comparative Example 14 is shown in Table 3.

Ink Sets of Example 14
Composition of Black Ink:

| Pigment Dispersion 1 as above | 40 parts |
|---|---|
| Glycerol | 8 parts |
| Trimethylolpropane | 5 parts |
| Isopropyl alcohol | 4 parts |
| Water | 43 parts |

Composition of Yellow Ink 14-1:

| C.I. Acid Yellow 23 | 2.5 parts |
|---|---|
| Glycerol | 5 parts |
| Diethylene glycol | 5 parts |
| ACETYLENOL EH (available from Kawaken Fine Chemicals Co., Ltd.) | 1 part |
| Magnesium nitrate hexahydrate | 1 part |
| Cryptand[222] | 2 parts |
| Nitric acid | 0.7 part |
| Water | 82.8 parts |

Composition of Yellow Ink 14-2:

| C.I. Acid Yellow 23 | 2.5 parts |
|---|---|
| Glycerol | 5 parts |
| Diethylene glycol | 5 parts |
| ACETYLENOL EH (available from Kawaken Fine Chemicals Co., Ltd.) | 1 part |
| Calcium nitrate tetrahydrate | 1 part |
| Cryptand[222] | 2 parts |
| Nitric acid | 0.7 part |
| Water | 82.8 parts |

Composition of Magenta Ink 14-1:

| C.I. Acid Red 289 | 2 parts |
|---|---|
| Glycerol | 8 parts |
| Diethylene glycol | 5 parts |
| ACETYLENOL EH (available from Kawaken Fine Chemicals Co., Ltd.) | 1 part |
| Magnesium nitrate hexahydrate | 1 part |
| Cryptand[222] | 2 parts |
| Nitric acid | 0.7 part |
| Water | 80.3 parts |

Composition of Magenta Ink 14-2:

| C.I. Acid Red 289 | 2 parts |
|---|---|
| Glycerol | 8 parts |
| Diethylene glycol | 5 parts |
| ACETYLENOL EH (available from Kawaken Fine Chemicals Co., Ltd.) | 1 part |
| Calcium nitrate tetrahydrate | 1 part |
| Cryptand[222] | 2 parts |
| Nitric acid | 0.7 part |
| Water | 80.3 parts |

Composition of Cyan Ink 14-1:

| C.I. Acid Blue 9 | 2 parts |
|---|---|
| Glycerol | 8 parts |
| Diethylene glycol | 5 parts |
| ACETYLENOL EH (available from Kawaken Fine Chemicals Co., Ltd.) | 1 part |
| Magnesium nitrate hexahydrate | 1 part |
| Cryptand[222] | 2 parts |
| Nitric acid | 0.7 part |
| Water | 80.3 parts |

Composition of Cyan Ink 14-2:

| C.I. Acid Blue 9 | 2 parts |
|---|---|
| Glycerol | 8 parts |
| Diethylene glycol | 5 parts |
| ACETYLENOL EH (available from Kawaken Fine Chemicals Co., Ltd.) | 1 part |
| Calcium nitrate tetrahydrate | 1 part |
| Cryptand[222] | 2 parts |
| Nitric acid | 0.7 part |
| Water | 80.3 parts |

Ink Set of Comparative Example 14
Composition of Black Ink:

| Pigment Dispersion 1 as above | 40 parts |
|---|---|
| Glycerol | 8 parts |
| Trimethylolpropane | 5 parts |
| Isopropyl alcohol | 4 parts |
| Water | 43 parts |

Composition of Yellow Ink:

| C.I. Acid Yellow 23 | 2.5 parts |
|---|---|
| Glycerol | 5 parts |
| Diethylene glycol | 5 parts |
| ACETYLENOL EH (available from Kawaken Fine Chemicals Co., Ltd.) | 1 part |
| Water | 86.5 parts |

Composition of Magenta Ink:

| | |
|---|---|
| C.I. Acid Red 289 | 2 parts |
| Glycerol | 8 parts |
| Diethylene glycol | 5 parts |
| ACETYLENOL EH (available from Kawaken Fine Chemicals Co., Ltd.) | 1 part |
| Water | 84 parts |

Composition of Cyan Ink:

| | |
|---|---|
| C.I. Acid Blue 9 | 2 parts |
| Glycerol | 8 parts |
| Diethylene glycol | 5 parts |
| ACETYLENOL EH (available from Kawaken Fine Chemicals Co., Ltd.) | 1 part |
| Water | 84 parts |

TABLE 4

Chief Composition of Ink Sets

| | Inks | | Coloring material | Polyvalent metal salt | Cryptands |
|---|---|---|---|---|---|
| Example 14 | | Black | Pigment dispersion 1 | None | None |
| | Color ink set 1 | Yellow 14-1 | C.I. Acid Yellow 23 | Mg nitrate | Cryptand [222] |
| | | Magenta 14-1 | C.I. Acid Red 289 | Mg nitrate | Cryptand [222] |
| | | Cyan 14-1 | C.I. Acid Blue 9 | Mg nitrate | Cryptand [222] |
| | Color ink set 2 | Yellow 14-2 | C.I. Acid Yellow 23 | Ca nitrate | Cryptand [222] |
| | | Magenta 14-2 | C.I. Acid Red 289 | Ca nitrate | Cryptand [222] |
| | | Cyan 14-2 | C.I. Acid Blue 9 | Ca nitrate | Cryptand [222] |
| Comp. Example 14 | | Black | Pigment dispersion 1 | None | None |
| | Color ink set | Yellow | C.I. Acid Yellow 23 | None | None |
| | | Magenta | C.I. Acid Red 289 | None | None |
| | | Cyan | C.I. Acid Blue 9 | None | None |

Mg: Magnesium
Ca: Calcium

Evaluation and Evaluation Criteria
Evaluation Test:
Evaluation tests are reported below.

Evaluation 1

The inks making up the ink sets of Example 14 and Comparative Example 14 obtained as above were each set in the following ink-jet recording apparatus, and the inks were ejected under the following conditions to make evaluation of ejection durability. As the ink-jet recording apparatus, an apparatus was used which had an on-demand type multiple recording head (BC-02, manufactured by CANON INC.) ejecting the inks by providing them with heat energy in accordance with recording signals. This multiple recording head was one having heads the outermost surface protective layers of heaters of which were each formed of tantalum and tantalum oxide. Ejection durability was evaluated using the above ink-jet recording apparatus, by ejecting inks respectively under the following conditions; the inks making up each ink set. Conditions for ejecting the inks in the ink-jet recording apparatus were as follows: The inks were each ejected at pulse widths of 1.1 µs (ON)+3.0 µs (OFF)+3.2 µs (ON) and at a drive frequency of 6,250 Hz under application of $V_{op}$ (drive voltage) corresponding to a γ value of 1.69 found by actually measuring $V_{th}$ (the critical energy that barely enables ejection). Then, ink ejection durability in the ink-jet recording apparatus when the ink-jet recording was performed under such conditions was evaluated in the following way and according to the following criteria. Results obtained are shown in Table 5.

1. Ejection durability

Continuous ejection was performed using the above ink-jet recording apparatus and under the above driving conditions. Ink droplets ejected from the recording head at intervals of $1 \times 10^6$ shots were collected in a container, and this container was weighed with an electronic balance. Then, an average ejected droplet quantity for every $1 \times 10^6$ shots was calculated from a gain in weight of the container during that ejection. Here, the continuous ejection was performed up to $1 \times 10^8$ shots. Then, an average ejected droplet quantity at the initial stage of from the first ejection up to the $1 \times 10^6$ shots was compared with an average ejected droplet quantity at the finish of the final ejection of the $1 \times 10^6$ shots in the durability test, to make evaluation according to the following criteria. Results obtained are shown in Table 5.

A: The average ejected droplet quantity during $9.9 \times 10^7$ to $1 \times 10^8$ shots at the finish of the test is 90% or more as compared with the average ejected droplet quantity during 0 to $1 \times 10^6$ shots at the initial stage of the test.

B: The average ejected droplet quantity during $9.9 \times 10^7$ to $1 \times 10^8$ shots at the finish of the test is from less than 90% to 70% or more as compared with the average ejected droplet quantity during 0 to $1 \times 10^6$ shots at the initial stage of the test.

C: The average ejected droplet quantity during $9.9 \times 10^7$ to $1 \times 10^8$ shots at the finish of the test is less than 70% as compared with the average ejected droplet quantity during 0 to $1 \times 10^6$ shots at the initial stage of the test.

D: The recording head has run into ejection disability on the way of the test.

TABLE 5

Evaluation Results of Ejection Durability

| | Inks | | Polyvalent metal salt | 1. Ejection durability |
|---|---|---|---|---|
| Example 14 | | Black | None | A |
| | Color ink set 1 | Yellow | Mg nitrate | A |
| | | Magenta | Mg nitrate | A |
| | | Cyan | Mg nitrate | A |
| | Color ink set 2 | Yellow | Ca nitrate | A |
| | | Magenta | Ca nitrate | A |
| | | Cyan | Ca nitrate | A |
| Comp. Example 14 | | Black | None | A |
| | Color ink set | Yellow | None | B |
| | | Magenta | None | C |
| | | Cyan | None | B |

Mg: Magnesium
Ca: Calcium

Evaluation 2

Examples 15, 16 & Comparative Examples 15, 16

In these working examples, images were formed by using the respective ink sets prepared in Example 14 and Comparative Example 14 to make evaluation on (2) color bleeding between the black ink and the color inks and (3), as white mist, the density of black ink areas at the boundaries where these areas adjoin color ink areas.

First, the inks making up each ink set were set in a color ink-jet printer (BJC-700J, manufactured by CANON INC.), an ink-jet recording apparatus having an on-demand type multiple recording head, to form images. This ink-jet recording apparatus is an apparatus of a recording system in which inks are ejected by providing the inks with heat energy in accordance with recording signals.

In forming images by using the ink sets prepared in Example 14 and Comparative Example 14, the images were formed in the same way as the above except that the manner of ejecting the inks was changed as described below, to make evaluation on the items (2) and (3) as detailed later. The images were formed in such a way that the black ink and the color inks were applied to a recording medium at the same position thereon and also the color inks were applied to the recording medium before the black ink was applied (underinking). The ink-jet recording process by such an underinking method was carried out as Example 16 and Comparative Example 16. In this underinking method, the amounts of the black ink and color ink applied, per unit area on the recording medium in its image-formed regions, were set in a ratio of black ink:color ink=10:2.5. The amounts of the color inks applied were set in a ratio of yellow ink: magenta ink:cyan ink=1:1:1. As recording mediums used for evaluation tests, two kings of plain paper were used which were copying paper available from CANON INC. (trade name: PB PAPER) and copying paper available from Xerox Corporation (trade name: XEROX 4024 PAPER). Results obtained are shown in Table 6 together.

(2) Evaluation on Color Bleeding between Black Ink and Color Ink

In the case of Example 15, on the above two kinds of plain paper each, solid areas were formed by printing with the black ink in the ink set and, immediately thereafter, solid areas of the ink with each color were formed by printing with the yellow, magenta or cyan ink in such a way that the former adjoined the latter. In the case of Example 16, the color ink was applied before the black ink was applied and, immediately thereafter, the black ink was applied. Color boundaries of solid print obtained were each visually observed to make evaluation on the color bleeding between the black ink and the color ink. Evaluation criteria were as follows:

A: No color bleeding is seen at every boundary.
B: Color bleeding is slightly seen at the boundaries.
C: Color bleeding is seriously seen at almost every boundary.

(3) Evaluation of Density at Black Ink Areas (White Mist) at Boundaries where the Black Ink Areas Adjoined the Color Ink Areas In the case of Example 15, on the above two kinds of plain paper each, solid areas were formed by printing with the black ink and, immediately thereafter, solid areas of the ink with each color were formed by printing with the yellow, magenta or cyan ink in such a way that the former adjoined the latter. In the case of Example 16, the color inks were applied before the black ink was applied and, immediately after the printing with the color inks, the black ink was applied. Then, whether or not any white mist occurred at boundaries where the black ink areas adjoined the color ink areas was visually observed to make evaluation. Evaluation criteria were as follows:

A: Any lowering of density of black ink areas at the color boundaries is not seen, thus any white mist is not seen to have occurred.
B: A lowering of density of black ink areas at the color boundaries is seen, thus white mist is seen to have occurred.
C: A serious lowering of density of black ink areas at the color boundaries is seen, thus white mist is seen to have greatly occurred.

TABLE 6

Evaluation Results on Color Bleeding and Black Ink Area Density

| | Employment of underinking method | (2)Color bleeding | | (3)White mist | |
|---|---|---|---|---|---|
| | | PB PAPER | 4024 PAPER | PB PAPER | 4024 PAPER |
| Example 15 | No | A | A | B | B |
| Example 16 | Yes | A | A | A | A |
| Comparative Example 15 | No | C | C | C | C |
| Comparative Example 16 | Yes | C | C | B | B |

"PB PAPER" and "4024 PAPER" in the table refer to PB PAPER, available from CANON INC., and XEROX 4024 PAPER, available from Xerox Corporation, respectively.

As having been described above, according to the present invention, it enables formation of images having water resistance, having a good print quality and less having the color bleeding that may occur in forming color images. Further, it can provide the liquid composition, ink-jet recording inks, ink-jet recording ink set, ink-jet recording process, recording unit, ink cartridge and ink-jet recording apparatus that can achieve long-lifetime service for the ink-jet recording head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-316458, filed Nov. 24, 2006, which is hereby incorporated by reference in its entirety.

What is claimed is:

1. An inkjet recording liquid composition which is used together with a colored ink to form images and is capable of causing reaction upon contact with the colored ink, the composition comprising:
(a) a polyvalent metal salt;
(b) a substance selected from cryptands;
(c) a liquid medium; and
(d) nitric acid.

2. The liquid composition according to claim 1, wherein the polyvalent metal salt is in a total content of from 0.005% by mass to 20% by mass based on the total mass of the liquid composition and the substance selected from cryptands is in a total content of from 0.005% by mass to 20% by mass based on the total mass of the liquid composition.

3. The liquid composition according to claim 1, wherein the polyvalent metal salt is at least one selected from the group consisting of polyvalent metal salts of any of nitric acid, sulfuric acid, hydrochloric acid, a carboxylic acid and a polyol phosphoric ester.

4. The liquid composition according to claim 3, wherein the polyvalent metal salt comprises magnesium nitrate, calcium nitrate, barium nitrate, iron(II) nitrate, copper(II) nitrate, zinc nitrate, yttrium nitrate, magnesium sulfate, calcium sulfate, barium sulfate, iron(II) sulfate, copper(II) sulfate, zinc sulfate, yttrium sulfate, magnesium acetate, calcium acetate, barium acetate, iron(II) acetate, copper(II) acetate, zinc acetate, yttrium acetate, magnesium gluconate, calcium gluconate, barium gluconate, iron(II) gluconate, copper(II) gluconate, zinc gluconate, magnesium glycerophosphate and calcium glycerophosphate.

5. The liquid composition according to claim 1, wherein the substance selected from cryptands is 4,7,13,16,21,24- hexaoxa-1,10-diazabicyclo[8,8,8]hexa-cosane (cryptand [222]) or 1,4,10,13-tetraoxa-7,16-diazacyclooctadecane represented by the following formulae.

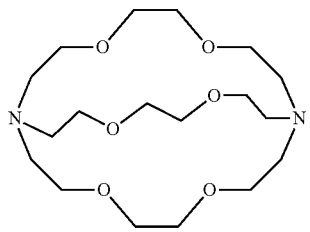

4,7,13,16,21,24-hexaoxa-1,10-diazabicyclo[8.8.8] hexacosane

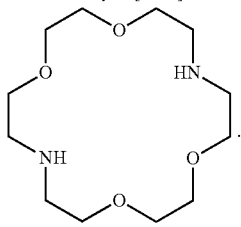

1,4,10,13-tetraoxa-7,16-diazacyclooctadecane

6. An ink-jet recording process comprising the steps of:
(i) providing, within a liquid composition holder of an ink jet recording apparatus, a liquid composition comprising in a mixture:
(a) a polyvalent metal salt;
(b) a substance selected from cryptands; and
(c) a liquid medium;
(ii) providing the liquid composition with energy to eject the liquid composition toward a recording medium so as to be applied onto the recording medium;
(iii) providing, within a colored ink holder of the ink-jet recording apparatus, a colored ink, wherein the colored ink comprises a coloring material and a liquid medium and is capable of reacting with the liquid composition upon contact with the liquid composition; and
(iv) providing the colored ink with energy to eject the colored ink toward the recording medium so as to be applied onto the recording medium
wherein the steps (ii) and (iv) are carried out in such a way that the state of contact of the liquid composition with the colored ink is produced on the recording medium.

7. An ink jet recording process according to claim 6, wherein the energy is thermal energy.

8. An ink jet recording process according to claim 6, wherein the polyvalent metal salt is selected from the group consisting of (i) a polyvalent metal salt of an inorganic acid selected from the group consisting of nitric acid, sulfuric acid, and hydrochloric acid, (ii) a polyvalent metal salt of a carboxylic acid selected from the group consisting of acetic acid, propionic acid, lactic acid, malic acid, and citric acid, and (iii) a polyvalent metal salt of a polyol phosphoric ester.

9. An ink jet recording process according to claim 6, wherein the polyvalent metal salt is a polyvalent metal salt of nitric acid.

10. An ink jet recording process according to claim 9, wherein the polyvalent metal salt is selected from the group consisting of magnesium nitrate, calcium nitrate, barium nitrate, iron(II) nitrate, copper(II) nitrate, zinc nitrate, and yttrium nitrate.

11. An ink jet recording process according to claim 6, wherein the polyvalent metal salt is a polyvalent metal salt of sulfuric acid.

12. An ink jet recording process according to claim 11, wherein the polyvalent metal salt is selected from the group consisting of magnesium sulfate, calcium sulfate, barium sulfate, iron(II) sulfate, copper(II) sulfate, zinc sulfate, and yttrium sulfate.

13. An ink jet recording process according to claim 6, wherein the polyvalent metal salt is a polyvalent metal salt of acetic acid.

14. An ink jet recording process according to claim 13, wherein the polyvalent metal salt is selected from the group consisting of magnesium acetate, calcium acetate, barium acetate, iron(II) acetate, copper(II) acetate, zinc acetate, and yttrium acetate.

15. An ink jet recording process according to claim 6, wherein the polyvalent metal salt is a polyvalent metal salt of polyol phosphoric ester.

16. An ink jet recording process according to claim 15, wherein the polyvalent metal salt is selected from the group consisting of magnesium glycerophosphate and calcium glycerophosphate.

17. An ink jet recording ink set comprising:
(1) the liquid composition according to claims 1; and
(2) at least one colored ink which contains a coloring material and a liquid medium and is capable of reacting with the liquid composition upon contact with the liquid composition.

18. A recording unit comprising:
a liquid composition holder which holds the liquid composition according to claim 1;
an ink holder which holds a colored ink capable of reacting with the liquid composition upon contact with the liquid composition; and
an ink-jet recording head having heads which provide the liquid composition and the colored ink with energy to eject the liquid composition and the colored ink respectively.

19. An ink cartridge comprising:
a liquid composition holder which holds the liquid composition according to claim 1; and
an ink holder which (i) holds a colored ink containing a coloring material and a liquid medium and (ii) is capable of reacting with the liquid composition upon contact with the liquid composition.

20. An ink-jet recording system comprising:
(i) a liquid composition, wherein the liquid composition comprises in a mixture:
(a) a polyvalent metal salt,
(b) a substance selected from cryptands; and
(c) a liquid medium;
(ii) a liquid composition holder which holds the liquid composition;
(iii) a colored ink capable of reacting with the liquid composition upon contact with the liquid composition;
(iv) a colored ink holder which holds the colored ink; and
(v) an ink jet recording head having heads which provide the liquid composition and the colored ink with energy to eject the liquid composition and the colored ink respectively.

21. An inkjet recording system according to claim 20, wherein the energy is thermal energy.

22. An ink jet recording system according to claim 20, wherein the polyvalent metal salt is selected from the group consisting of (i) a polyvalent metal salt of an inorganic acid selected from the group consisting of nitric acid, sulfuric acid, and hydrochloric acid, (ii) a polyvalent metal salt of a carboxylic acid selected from the group consisting of acetic acid, propionic acid, lactic acid, malic acid, and citric acid, and (iii) a polyvalent metal salt of a polyol phosphoric ester.

23. An ink jet recording system according to claim 20, wherein the polyvalent metal salt is a polyvalent metal salt of nitric acid.

24. An ink jet recording system according to claim 23, wherein the polyvalent metal salt is selected from the group consisting of magnesium nitrate, calcium nitrate, barium nitrate, iron(II) nitrate, copper(II) nitrate, zinc nitrate, and yttrium nitrate.

25. An ink jet recording system according to claim 20, wherein the polyvalent metal salt is a polyvalent metal salt of sulfuric acid.

26. An ink jet recording system according to claim 25, wherein the polyvalent metal salt is selected from the group consisting of magnesium sulfate, calcium sulfate, barium sulfate, iron(II) sulfate, copper(II) sulfate, zinc sulfate, and yttrium sulfate.

27. An ink jet recording system according to claim 20, wherein the polyvalent metal salt is a polyvalent metal salt of acetic acid.

28. An ink jet recording system according to claim 27, wherein the polyvalent metal salt is selected from the group consisting of magnesium acetate, calcium acetate, barium acetate, iron(II) acetate, copper(II) acetate, zinc acetate, and yttrium acetate.

29. An ink jet recording system according to claim 20, wherein the polyvalent metal salt is a polyvalent metal salt of polyol phosphoric ester.

30. An ink jet recording system according to claim 29, wherein the polyvalent metal salt is selected from the group consisting of magnesium glycerophosphate and calcium glycerophosphate.

\* \* \* \* \*